(12) United States Patent
Suzuki et al.

(10) Patent No.: US 8,630,850 B2
(45) Date of Patent: Jan. 14, 2014

(54) SIGNAL PROCESSING METHOD, APPARATUS AND PROGRAM

(75) Inventors: Kaoru Suzuki, Yokohama (JP); Tadashi Amada, Yokohama (JP)

(73) Assignee: Kabushiki Kaisha Toshiba, Minato-ku, Tokyo (JP)

( * ) Notice: Subject to any disclaimer, the term of this patent is extended or adjusted under 35 U.S.C. 154(b) by 121 days.

(21) Appl. No.: 13/240,353

(22) Filed: Sep. 22, 2011

(65) Prior Publication Data

US 2012/0072210 A1    Mar. 22, 2012

Related U.S. Application Data

(63) Continuation of application No. PCT/JP2010/054032, filed on Mar. 10, 2010.

(30) Foreign Application Priority Data

Mar. 25, 2009 (JP) ................................ 2009-073902

(51) Int. Cl.
   *G10L 21/00* (2006.01)
(52) U.S. Cl.
   USPC ........................... 704/226; 370/286; 370/290
(58) Field of Classification Search
   USPC .................................. 704/226; 370/286, 290
   See application file for complete search history.

(56) References Cited

U.S. PATENT DOCUMENTS

| | | | |
|---|---|---|---|
| 5,727,123 A * | 3/1998 | McDonough et al. | 704/224 |
| 5,899,828 A * | 5/1999 | Yamazaki et al. | 477/4 |
| 6,181,794 B1 * | 1/2001 | Park et al. | 379/406.08 |
| 6,563,803 B1 * | 5/2003 | Lee | 370/290 |
| 6,804,203 B1 * | 10/2004 | Benyassine et al. | 370/286 |

FOREIGN PATENT DOCUMENTS

| | | |
|---|---|---|
| JP | 61273017 A | 12/1986 |
| JP | 63065722 A | 3/1988 |
| JP | 2928801 B2 | 6/1989 |
| JP | 82-13880 A | 8/1996 |
| JP | 10-28080 A | 1/1998 |
| JP | 2885269 B2 | 4/1999 |
| JP | 2000-286763 A | 10/2000 |
| JP | 2000332574 A | 11/2000 |

(Continued)

OTHER PUBLICATIONS

First Office Action dated Jan. 8, 2013 for corresponding Japanese Patent Application No. 2009-073902 with English translation consisting of 6 pages.

(Continued)

*Primary Examiner* — Daniel D Abebe
(74) *Attorney, Agent, or Firm* — Ohlandt, Greeley, Ruggiero & Perle, L.L.P.

(57) ABSTRACT

In one embodiment, a signal processing method is disclosed. The method can perform filter processing of convoluting a tap coefficient in a first signal sequence to generate a second signal sequence. The method can subtract the second signal sequence from a third signal sequence to generate a fourth signal sequence. The third signal sequence includes an echo signal of the first signal sequence. The method can correct the tap coefficient in accordance with an amount of correction determined using a function. The function includes at least one of a first region and a second region, and has values limited. The first region is included in a negative value region of the fourth signal sequence. The second region is included in a positive value region of the fourth signal sequence.

18 Claims, 13 Drawing Sheets

(56) References Cited

FOREIGN PATENT DOCUMENTS

| | | |
|---|---|---|
| JP | 2004-064681 A | 2/2004 |
| JP | 2005-124026 A | 5/2005 |
| JP | 2005-124027 A | 5/2005 |
| JP | 3870861 B2 | 1/2007 |

OTHER PUBLICATIONS

International Search Report dated Jun. 1, 2010 for corresponding International Patent Application No. PCT/JP2010/054032 consisting of 2 pages.

Written Opinion dated Jun. 1, 2010 for corresponding International Patent Application No. PCT/JP2010/054032 consisting of 5 pages.

International Preliminary Report on Patentability dated Oct. 18, 2011 for corresponding International Patent Application No. PCT/JP2010/054032 consisting of 6 pages.

First Office Action dated Apr. 2, 2013 for corresponding Japanese Patent Application No. 2009-073902 with English translation consisting of 6 pages.

International Preliminary Report on Patentability (English translation) dated Oct. 27, 2011 from corresponding PCT/JP2010/054032, 7 pages.

\* cited by examiner

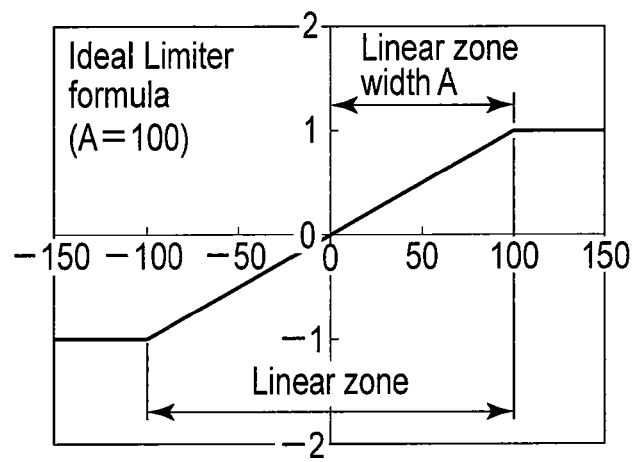
F I G. 4
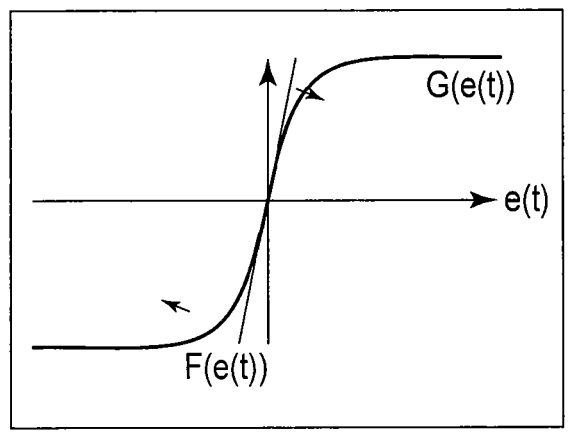
F I G. 5

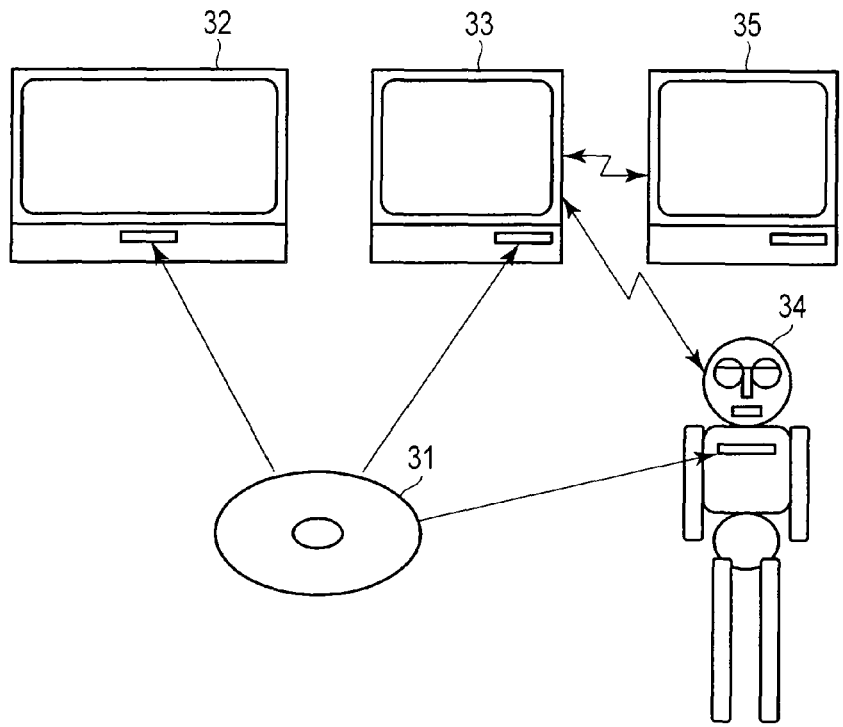
F I G. 1 8
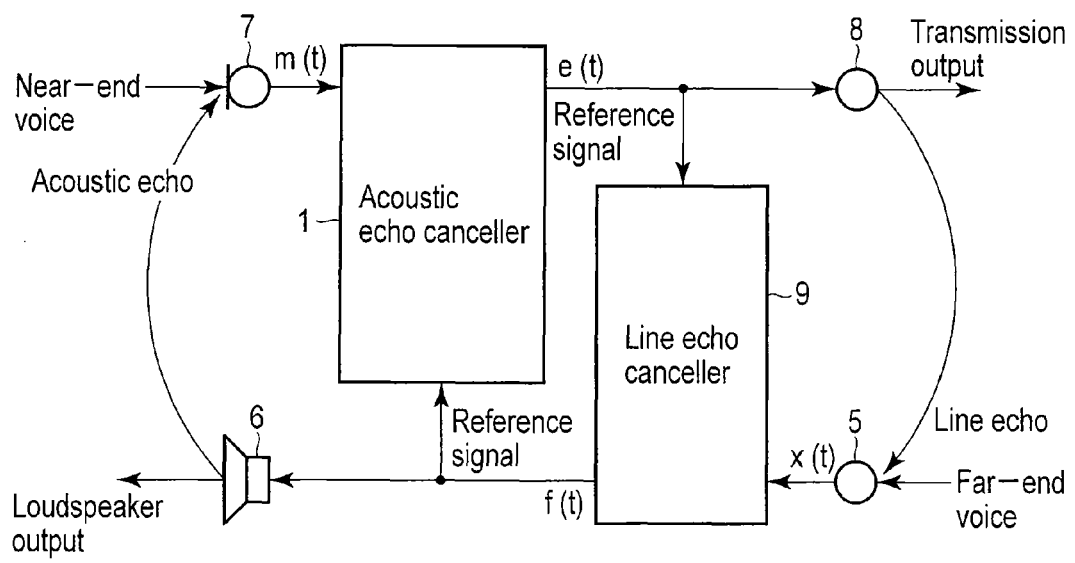
F I G. 1 9

SIGNAL PROCESSING METHOD, APPARATUS AND PROGRAM

CROSS-REFERENCE TO RELATED APPLICATIONS

This application is a Continuation Application of PCT Application No. PCT/JP2010/054032, filed Mar. 10, 2010 and based upon and claiming the benefit of priority from prior Japanese Patent Application No. 2009-073902, filed Mar. 25, 2009, the entire contents of all of which are incorporated herein by reference.

FIELD

Embodiments described herein relate generally to a signal processing method, apparatus and program for echo canceling.

BACKGROUND

Acoustic echo cancellers are used in amplifying call apparatuses that perform transmission and reception of voice through, for example, a transmission path, amplify and output, through a loudspeaker, the voice (far-end voice) received from a destination terminal, and transmit the voice (near-end voice) picked by a microphone. If far-end voice output through the loudspeaker is picked up by the microphone, a phenomenon will occur in which the voice emitted from the destination terminal returns thereto as an echo (acoustic echo). In general, since a certain delay occurs in the transmission path, the acoustic echo may well disturb voice communication.

To cancel or reduce such an acoustic echo, echo cancellers are used. At an originator terminal, a received input as the cause of the acoustic echo is detected. If a transformation corresponding to the transfer characteristic of an echo path is executed on the received input, a replica of an acoustic echo mixing in the output of the microphone can be produced internally. By subtracting the echo replica from the microphone output, an output signal (error signal) with suppressed acoustic echo can be produced. The mechanism for achieving this process is an echo canceller.

In an echo canceller, an acyclic linear filter of a tap number N (FIR filter) is often used as a linear filter for simulating the transfer characteristic of the echo path. By performing convolution of the tap coefficient of the filter and the received input, an echo replica is produced.

In general, it is difficult to instantly and correctly impart, to a filter, the transfer characteristic of the echo path that varies instantaneously. Therefore, an adaptive algorithm for asymptotically detecting the transfer characteristic based on an observed signal is utilized. As a group of adaptive algorithms, stochastic gradient algorithms are known in which the tap coefficient is corrected in accordance with an instantaneous square error gradient (stochastic gradient) associated with the tap coefficient. As the stochastic gradient algorithms, a least mean square error (LMS) algorithm or a normalized LMS (NLMS) algorithm are known.

However, the tap coefficient correcting amount in an LMS algorithm or NLMS algorithm is proportional to a reference signal and an error signal, and is therefore very great. Because of this, during double talk in which near-end voice and far-end voice coexist, significantly erroneous adjustment may occur. To avoid such erroneous adjustment, it is necessary to suppress the tap coefficient correcting amount or to completely stop the correction during double talk. When employing such algorithms, it is necessary to provide a double-talk detector for detecting double talk to control a tap coefficient correcting unit.

Japanese Patent No. 3870861 (Patent Document 1) discloses an echo canceller utilizing an independent component analysis (Infomax formula) based on information entropy maximization, in which canceller, a tap coefficient is corrected so as to make a reference signal and an error signal independent of each other. The echo canceller of Patent Document 1 employs a tap coefficient correcting expression wherein the function $G(e(t))$ of an error signal $e(t)$ is set to a sign function: $sign(e(t))$, a hyperbolic tangent function: $tan\, h(e(t))$, or a sigmoid function: $1/(1+exp(-e(t)))$. Algorithms using these functions will now be collectively referred to as "the Infomax formula." In the Infomax formula, the coefficient correction scale does not exceed a preset peak level, which is considered to suppress erroneous correction during double talk. Because of this, the Infomax formula does not require a double talk detector and therefore enables the entire system to be made more compact.

However, in the Infomax formula, the residual echo level is high, i.e., echo cancellation is insufficient. This may be because the scale of coefficient correction performed for a minimal-error is excessively large and hence overshoot will occur.

Japanese Patent No. 2885269 (Patent Document 2) discloses a tap coefficient correcting expression, the function $G(e(t))$ of which includes a linear zone wherein the amount of correction is proportional to the error signal $e(t)$ in a small error region in a sign algorithm. In the algorithm of Patent Document 2, the overshoot suppression effect of the linear zone realizes a residual echo level lower than in the sign algorithm. In other words, the algorithm of Patent Document 2 is an algorithm obtained by providing the LMS algorithm with a correction scale limiter. This algorithm will be hereinafter referred to as "the Ideal Limiter formula." By virtue of the limiter effect, the algorithm of Patent Document 2 exhibits robustness against double talk, like the Infomax formula. However, the convergence speed of the tap coefficient in the Ideal Limiter formula is lower than in the Infomax formula. It is apparent that the reason for it lies in the relative small coefficient correction scale in the linear zone.

JP-A 2004-64681 (KOKAI) (Patent Document 3) discloses an adaptive algorithm that provides an effect of accelerating the same convergence as a least mean fourth (LMF) algorithm. However, the algorithm of Patent Document 3 does not exhibit robustness against double talk, which is similar to the LMS algorithm. Further, in this algorithm, since the tap coefficient correction scale monotonically increases in accordance with the instantaneous absolute value of an error signal, it exhibits a significant error correction during double talk, as in the LMF algorithm.

Figure 3:
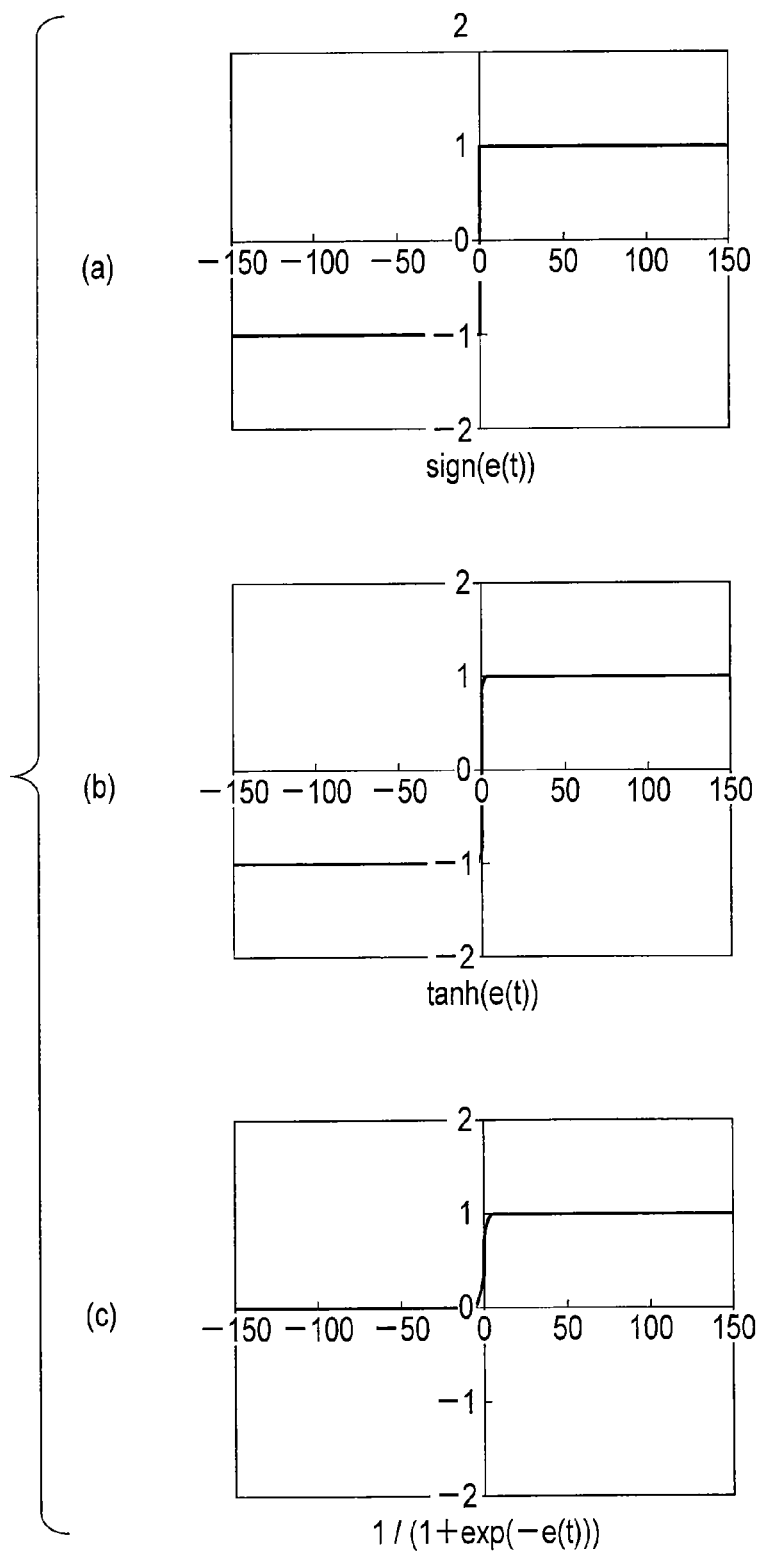
Figure 6:
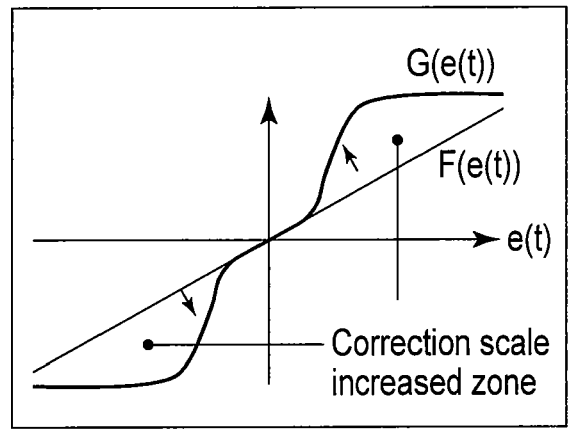
Figure 7:
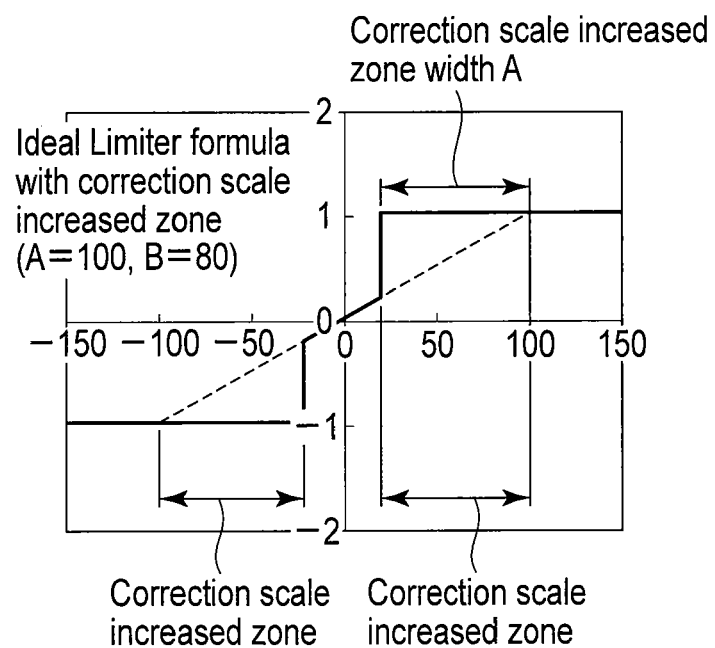
Figure 8:
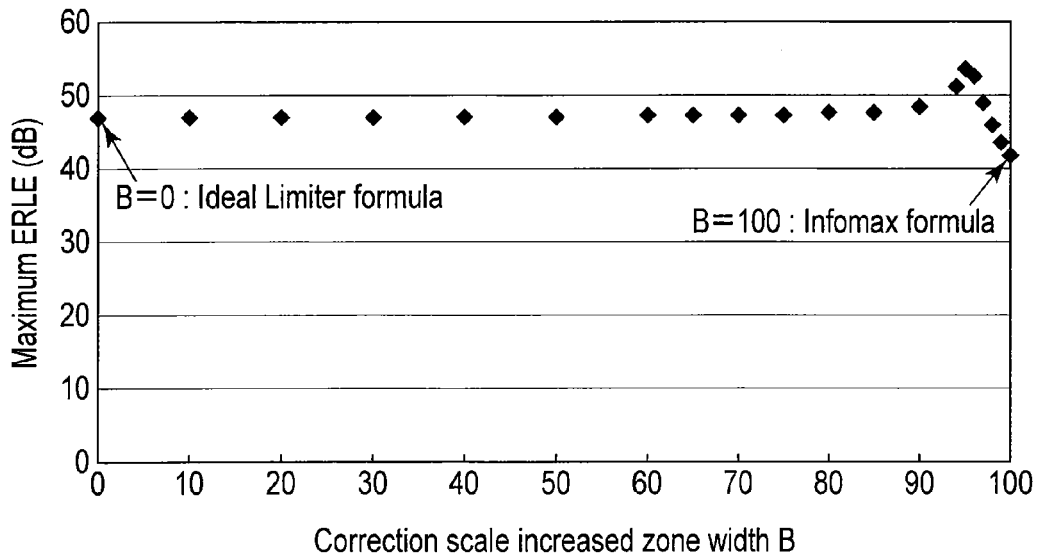
Figure 9:
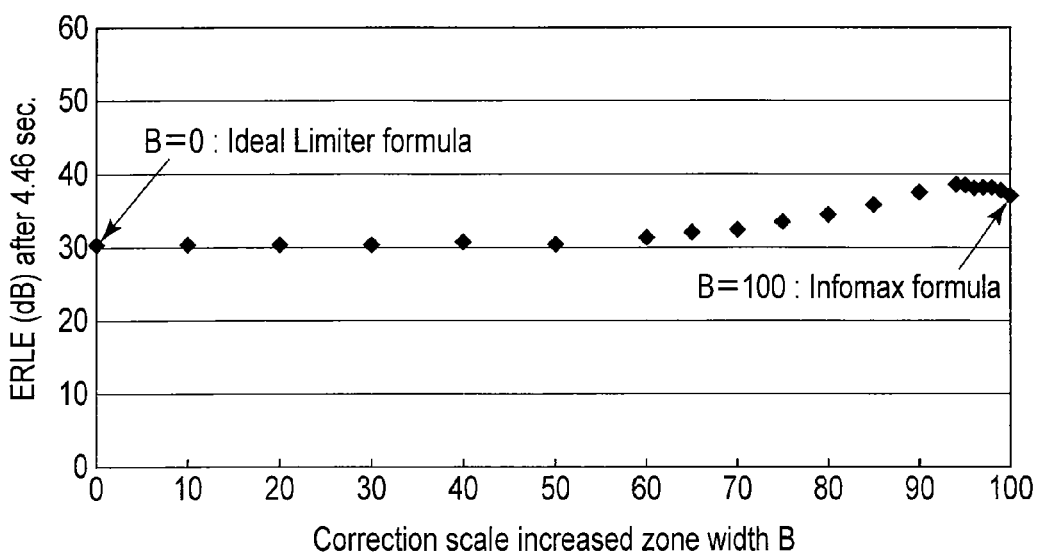
Figure 10:
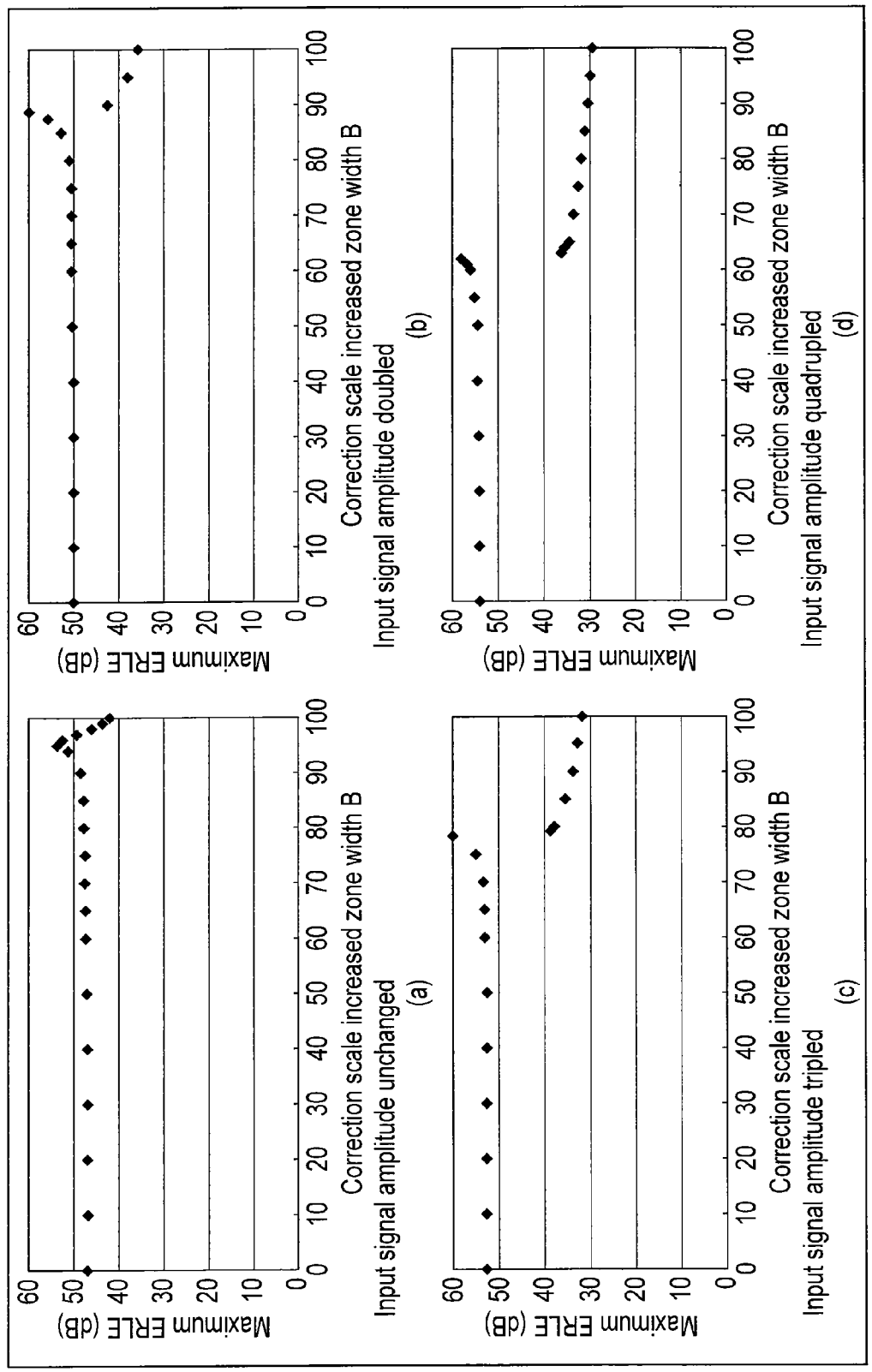
Figure 11:
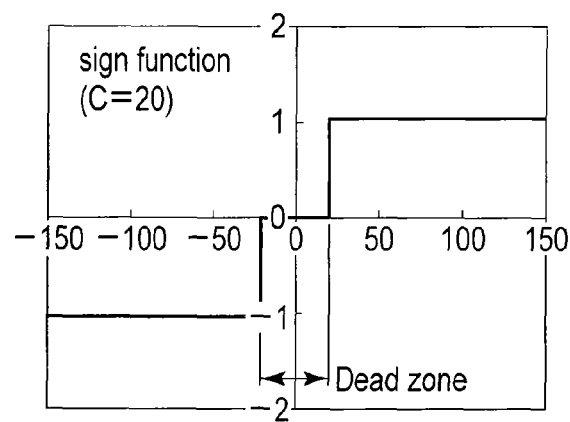
Figure 12:
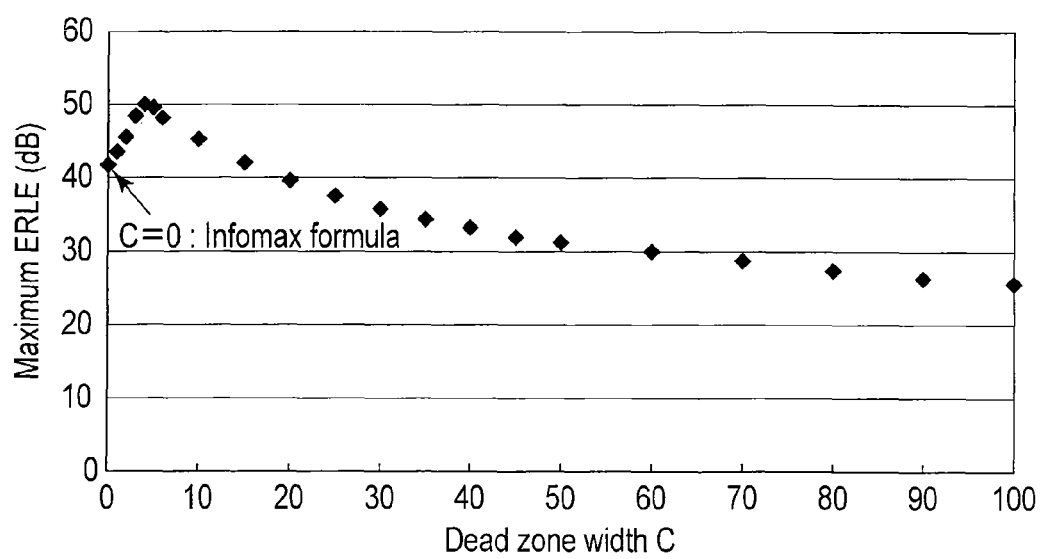
Figure 13:
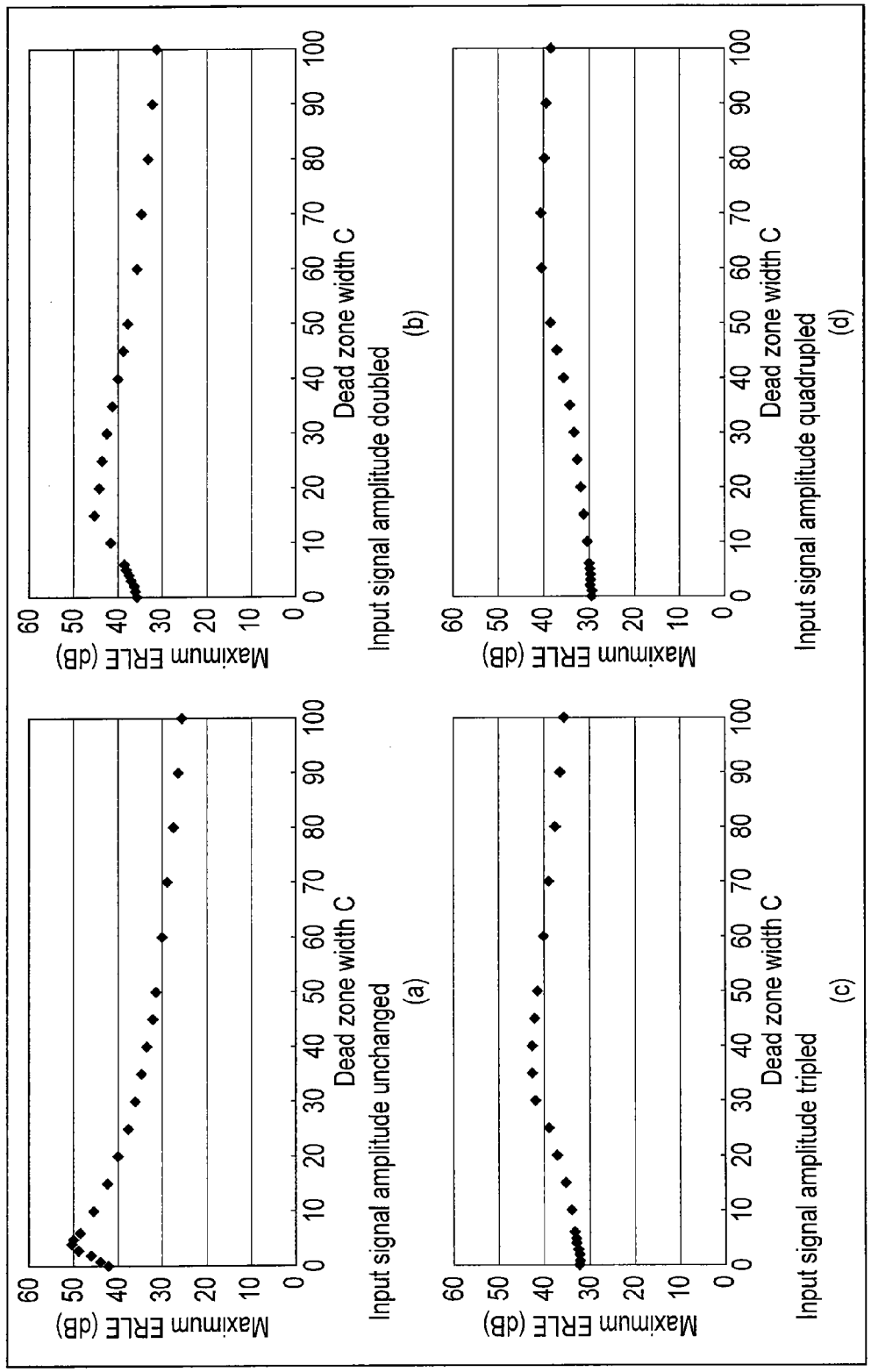
Figure 14:
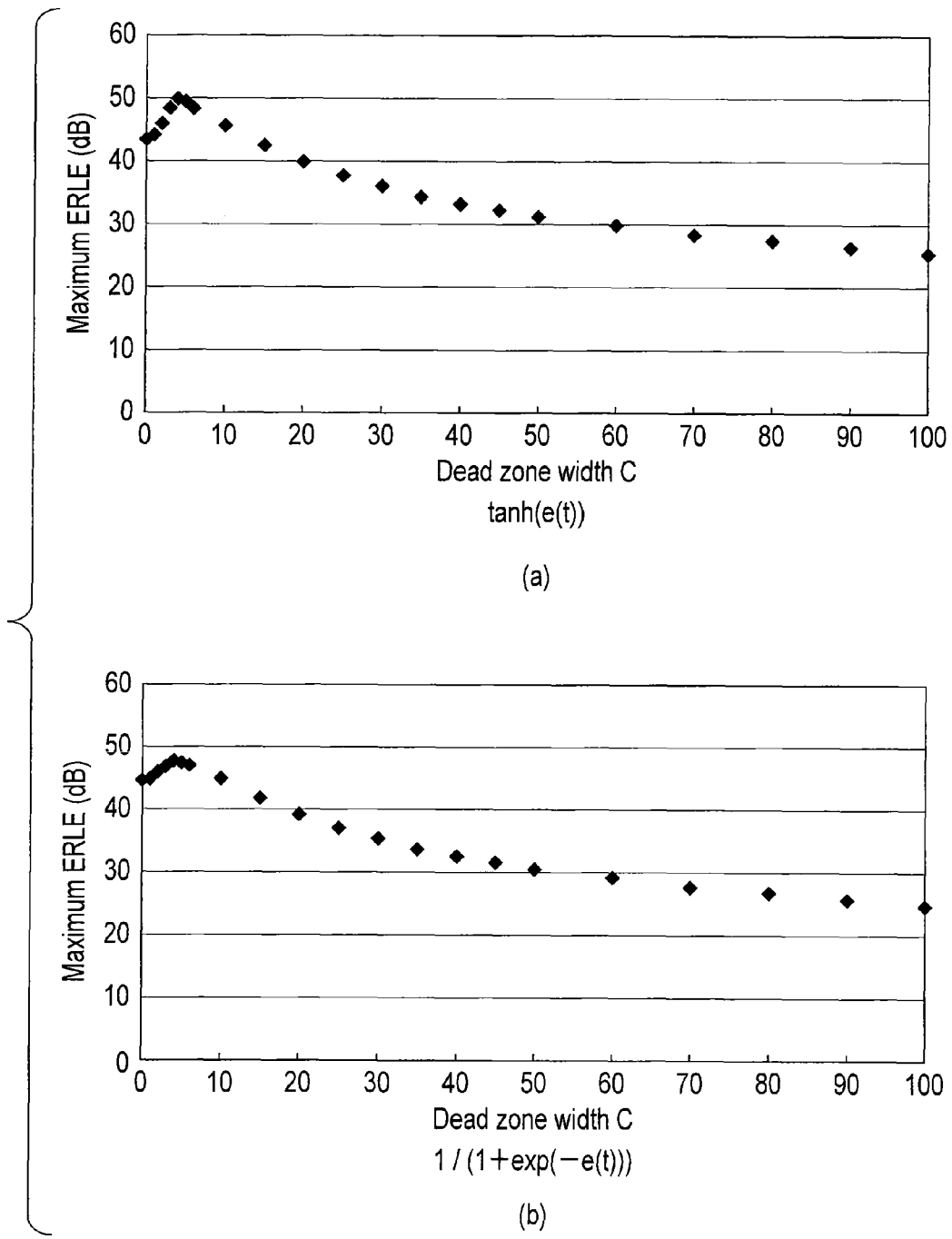
Figure 15:
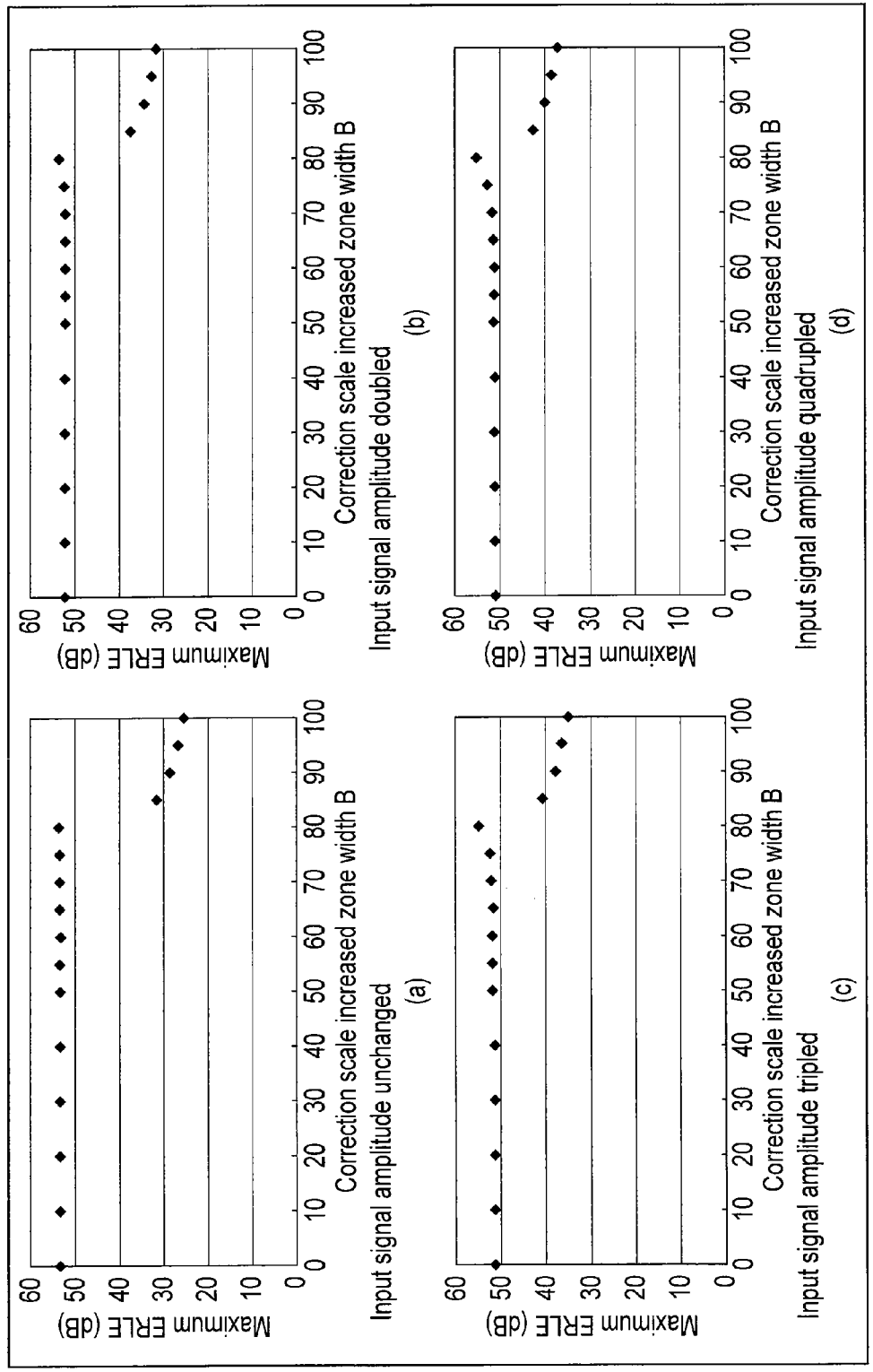
Figure 16:
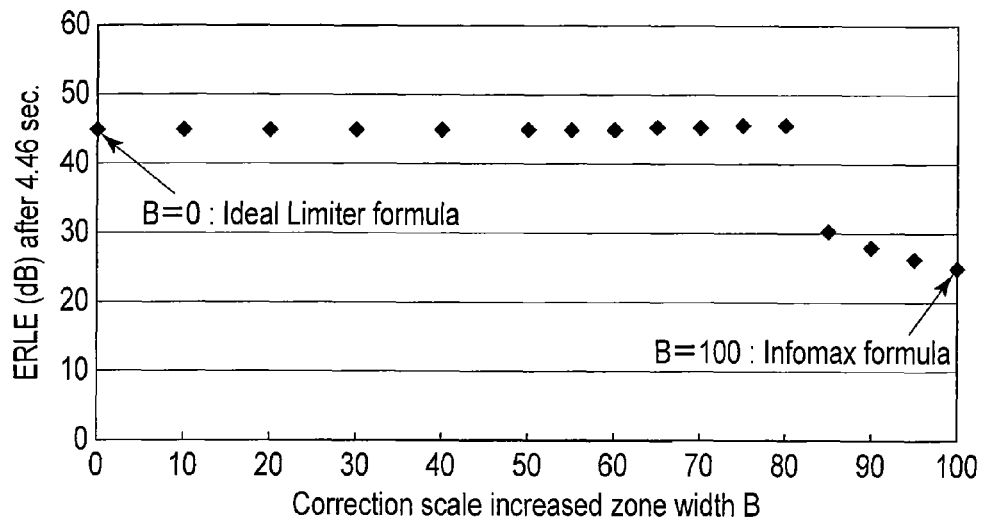
Figure 17:
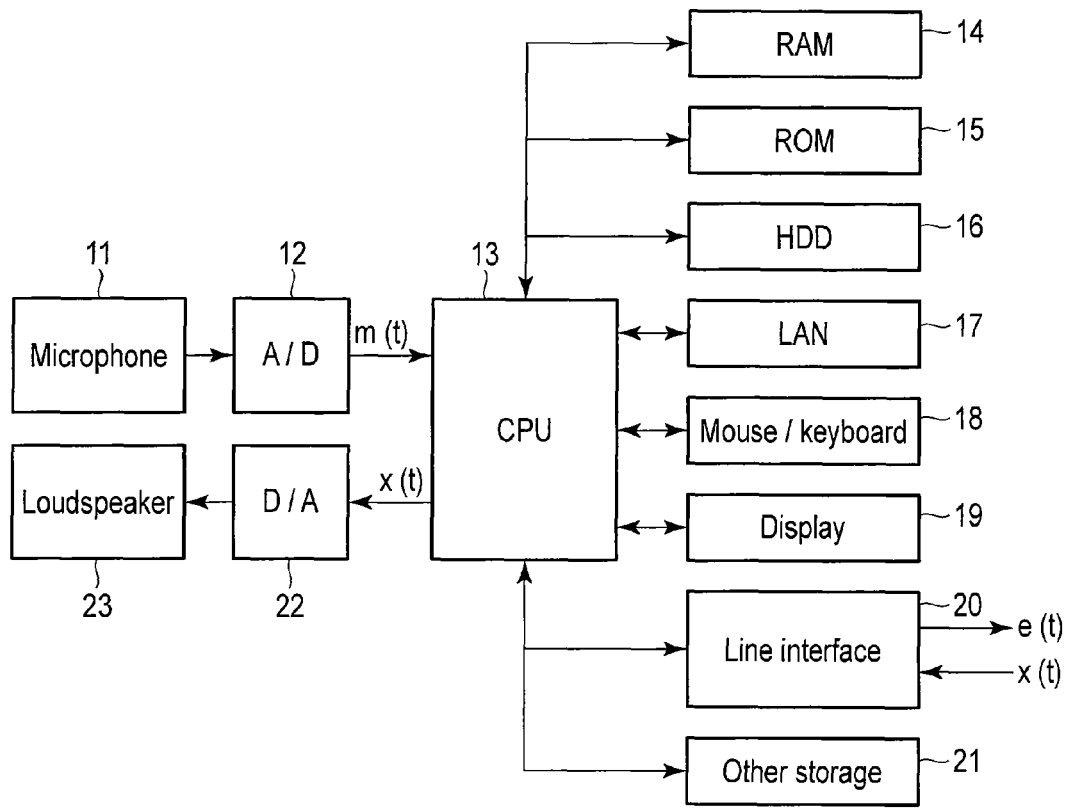

(a), (b) and (c) of FIG. 3 are graphs indicating three functions according to Infomax formula;

FIG. 4 is a graph representing a function according to Ideal Limiter formula;

FIG. 5 is a schematic graph representing the graphical characteristic of a function $G(e(t))$ according to the prior art;

FIG. 6 is a schematic graph representing the graphical characteristic of a function G(e(t)) according to an embodiment;

FIG. 7 is a graph representing a function according to Ideal Limiter formula with a correction scale increased zone;

FIG. 8 is a graph representing variations in maximum ERLE assumed when correction scale increased zone with B is changed;

FIG. 9 is a graph representing variations in convergence speed assumed when correction scale increased zone with B is changed;

(a), (b), (c) and (d) of FIG. 10 are graphs representing variations in maximum ERLE assumed when signal amplitude is changed;

FIG. 11 is a graph representing a sing function with a dead zone;

FIG. 12 is a graph representing variations in maximum ERLE assumed when correction scale increased zone with C is changed;

(a), (b), (c) and (d) of FIG. 13 are graphs representing (normalized) variations in maximum ERLE assumed when signal amplitude is changed;

(a) and (b) of FIG. 14 are graphs representing variations in maximum ERLE assumed when different functions are used;

(a), (b), (c) and (d) of FIG. 15 are graphs representing (normalized) variations in maximum ERLE assumed when signal amplitude is changed;

FIG. 16 is a graph representing (normalized) variations in convergence speed assumed when signal amplitude is changed;

FIG. 17 is a block diagram illustrating a signal processing apparatus formed of a computer, according to a modification of the embodiment;

FIG. 18 is a view illustrating another modification using a recording medium; and FIG. 19 is a block diagram illustrating an amplifying call apparatus comprising an acoustic echo canceller and a line echo canceller, according to another embodiment.

DETAILED DESCRIPTION

In general, according to one embodiment, a signal processing method for being improved in echo cancellation performance and convergence speed of an echo canceller is disclosed. The method can perform filter processing of convoluting a tap coefficient in a first signal sequence to generate a second signal sequence. The method can subtract the second signal sequence from a third signal sequence to generate a fourth signal sequence. The third signal sequence includes an echo signal of the first signal sequence. The method can correct the tap coefficient in accordance with an amount of correction determined using a function of the fourth signal sequence as a parameter. The function includes at least one of a first region and a second region, and has values limited. The first region is included in a negative value region of the fourth signal sequence. The first region is a region where the function outputs a value less than a value indicated by a straight line. The second region is included in a positive value region of the fourth signal sequence. The second region is a region where the function outputs a value greater than a value indicated by the straight line. The straight line has a slope and an intercept that are identical to a slope and an intercept of the function assumed when the fourth signal sequence has a value of 0. The slope excludes zero.

The embodiments provide a signal processing method, apparatus and program that are improved in echo cancellation performance and convergence speed of an echo canceller.

Embodiments will be described with reference to the accompanying drawings.

Figure 1:
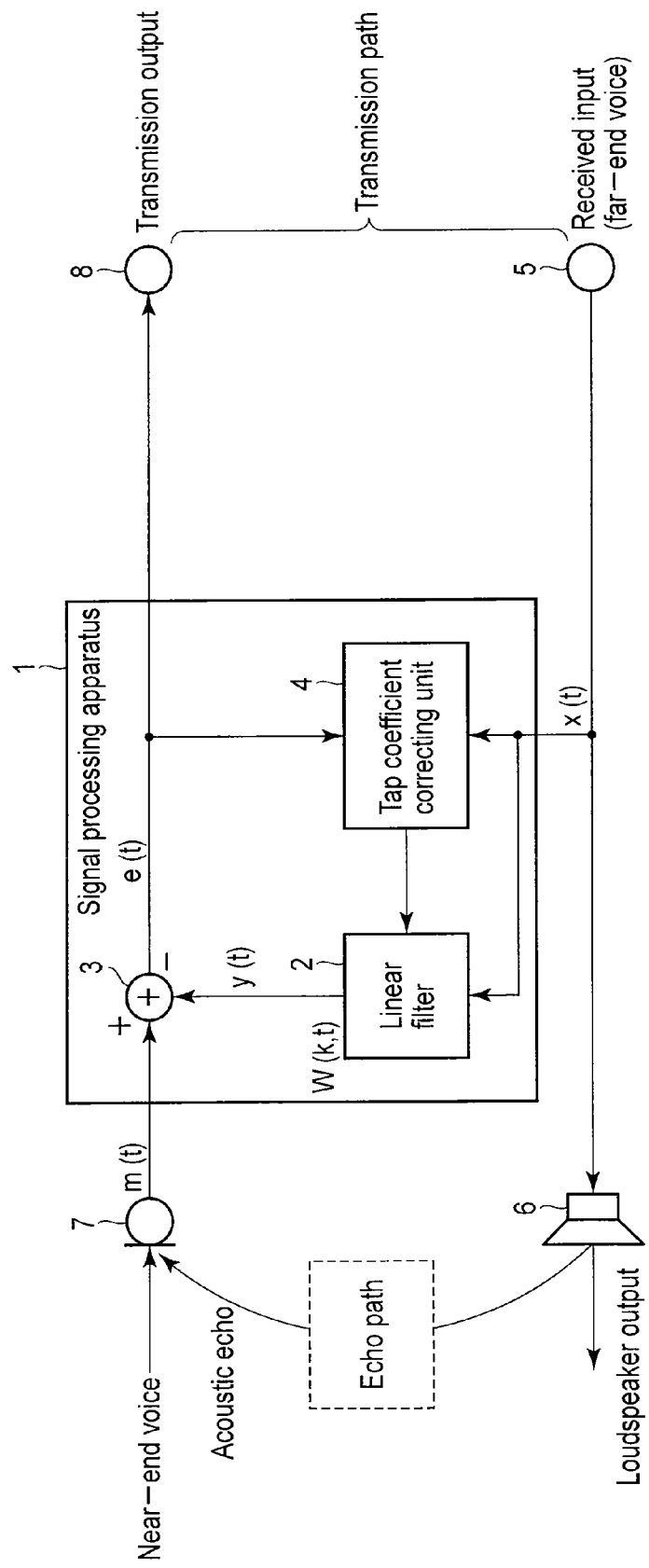
FIG. 1 is a block diagram illustrating a signal processing apparatus (acoustic echo canceller) according to an embodiment.

As shown in FIG. 1, a signal processing apparatus 1 according to an embodiment comprises a linear filter 2, a subtractor 3, and a tap coefficient correcting unit 4. Far-end voice as a received input from a transmission path to a received-input terminal 5 is input as a reference signal x(t) (a first signal sequence) to the linear filter 2 and the tap coefficient correcting unit 4 of the signal processing apparatus 1, and is amplified and output by a loudspeaker 6.

On the other hand, an output m(t) (a third signal sequence), output from a microphone 7 which receives near-end voice and acoustic echo that is an output of the loudspeaker 6 and is returned to the microphone 7 via an echo path, is input to the signal processing apparatus 1.

The linear filter 2 is an acyclic linear filter (FIR filter) of tap number N that is used to simulate the transfer characteristic of the echo path. The linear filter 2 generates an echo replica signal y(t) (a second signal sequence) corresponding to the acoustic echo, based on the reference signal x(t) as the received input, using the following equation (1). Namely, the linear filter 2 generates the echo replica signal y(t) by performing filtering in which the reference signal x(t) is combined with each tap coefficient w (k, t) of the filter 2 by convolution.

$$y(t) = \sum_{k=0}^{N-11} (w(k, t) \cdot x(t - k)) \quad (1)$$
$$= W(t)^T X(t)$$

where the echo replica signal y(t) is a time-series signal, and indicates the value of the echo replica at time t, w(k, t) is the value of the tap coefficient with tap number k of the filter 2 assumed at time point t, x(t−k) is the value of the reference signal assumed at a past time point earlier from the time point t by a time point k, and N is the number of taps. Further, W(t) is a column vector that has, as vector components, the tap coefficients w(k, t) (k is a natural number ranging from 0 to N−1), and X(t) is a column vector that has, as vector components, the reference signals x(t−k) (k is a natural number ranging from 0 to N−1), given by the following equations (2):

$$W(t)=[w(0,t),w(1,t),\ldots w(N-1,t)]^T$$

$$X(t)=[x(t),x(t-1),\ldots x(t-N+1)]^T \quad (2)$$

The thus-generated echo replica signal y(t) is subtracted from the microphone output m(t) by the subtractor 3 as shown in the following equation (3), thereby generating an error signal (a fourth signal sequence) e(t) (instantaneous value) as a transmission output, and outputting it through a transmission output terminal 8:

$$e(t)=m(t)-y(t) \quad (3)$$

The tap coefficient correcting unit 4 corrects the tap coefficient of the linear filter 2 using a tap coefficient correcting expression expressed by the following recurrence equation (4):

$$W(t+1)=W(t)+\mu \cdot \gamma \cdot G(e(t)) \cdot X(t) \quad (4)$$

The equation (4) is a generalized tap coefficient correcting expression based on a stochastic gradient algorithm. W(t) is a tap coefficient before correction, and W(t+1) is a tap coefficient after correction. The second term of the right side represents the amount of correction in tap coefficient. Positive number γ is a normalized coefficient, positive number μ is a step size, and G(e(t)) is a function of the error signal (instantaneous value) e(t), which are all scalar values. In general, the product of the normalized coefficient γ and the step size μ is handled as one value and called a step size. In this description, however, two values γ and μ are treated as different values for facilitating the explanation.

In the embodiment, the function G(e(t)) of the error signal e(t) employed as one of the parameters for the coefficient correcting amount in the tap coefficient correcting unit 4 has a graphical characteristic different from that of the conventional one.

Figure 2:
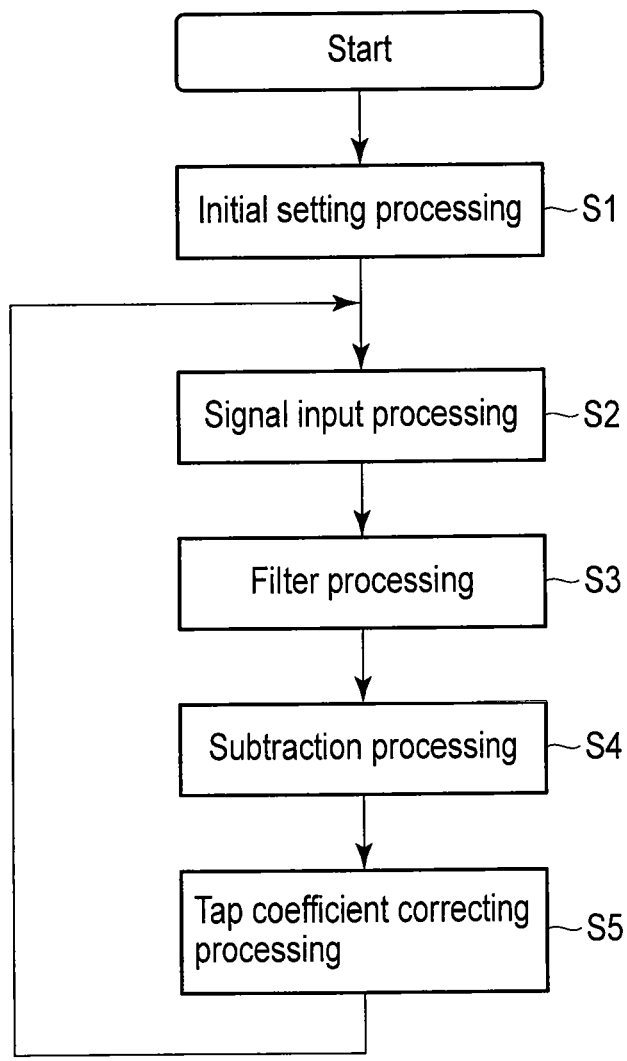
FIG. 2 is a flowchart useful in explaining the flow of processing performed in the signal processing apparatus of FIG. 1.

Referring then to FIG. 2, a description will be given of the flow of processing performed in the embodiment.

At default setting step S1, the state of the signal processing apparatus 1 is initialized. More specifically, each tap coefficient of the linear filter 2 is set to a certain initial value (in many cases, the initial value is 0).

At signal input processing step S2, the microphone output m(t) and the far-end voice x(t) are input. Assume here that the signal input processing step S2 includes a process of amplifying and outputting the far-end voice x(t) by the loudspeaker 6.

At filtering step S3, an acoustic echo replica y(t) is generated using the above-mentioned equation (1), using the input far-end voice x(t) as a reference signal. This step is executed using the linear filter 2.

At subtraction step S4, the echo replica y(t) is subtracted from the microphone output m(t) in accordance with the equations (2) to thereby generate the error signal e(t). Assume that the subtraction step S4 includes a process of transmitting the generated error signal e(t), and is executed by the subtractor 3.

At tap coefficient correcting step S5, the tap coefficient of the linear filter 2 is corrected based on the error signal e(t), using the tap coefficient correcting expression (4). This process is executed by the tap coefficient correcting unit 4.

A description will now be given of the graphical characteristic of the function G(e(t)) of the error signal e(t) included in the equation (4). However, before describing this, the conventional algorithm will be referred to.

The algorithm obtained by applying, to the equation (4), the function G(e(t)) and the normalized coefficient γ defined in the following equations (5) is known as the LMS algorithm (least mean square error algorithm).

$$G(e(t))=e(t)$$

$$\gamma=1 \quad (5)$$

Further, the algorithm obtained by replacing, with $1/X^TX$, the normalized coefficient γ in the LMS algorithm is the NLMS algorithm (normalized LMS algorithm). The definition of the NLMS algorithm will be described later. $X^TX$ represents the sum of electricity of N reference signal values obtained during the time period between the present time and the first sampling time point N−1 (assuming that the present time is the last sampling time point and is set to 0). Thus, in the LMS and NLMS algorithms, the tap coefficient for minimizing the square mean value of the error signal is asymptotically calculated using the error signal e(t) (instantaneous value) assumed at each sampling time point.

In general, the corrected tap coefficient amount is proportional to the reference signal x(t) as shown in the equation (4). However, the coefficient correcting amount in the LMS and NLMS algorithm is very great amount without upper limit because it is proportional not only to the reference signal x(t), but also to the error signal e(t), as is expressed by G(e(t))=e(t) in the equation (5).

On the other hand, the Infomax formula disclosed in the aforementioned Patent Document 1 employs such a coefficient correcting expression as given by the following equations (6) that uses a sign function: sign(e(t)), a hyperbolic tangent function: tan h(e(t)), or a sigmoid function: 1/(1+exp(−e(t)):

$$G(e(t)) = \text{sign}(e(t)) \quad (6)$$

$$G(e(t)) = \tanh(e(t))$$

$$G(e(t)) = \text{sigmoid}(e(t)) = \frac{1}{1+\exp(-e(t))}$$

$$\gamma = 1$$

These functions are shown in (a), (b) and (c) of FIG. 3. The horizontal axis indicates the error signal e(t) (instantaneous value), and the vertical axis indicates the value of the function G(e(t)). The formula using sign(e(t)) is known as a sign algorithm. Both tan h(e(t)) and 1/(1+exp(−e(t))) are sign(e(t)) approximating functions in the full-wave region (positive and negative regions) of e(t) and in the half-wave region (only positive region) of e(t), respectively, and are considered to serve in substantially the same way as the sign algorithm.

As shown in (a), (b) and (c) of FIG. 3, in the Infomax formula, the coefficient correction scale does not exceed a preset peak level, which is considered to suppress erroneous correction during double talk. Accordingly, no double talk detector is needed. However, in the Infomax formula, the residual echo level is high. This may be because the scale of coefficient correction performed when there is a minimal-error (as at the origins of (a), (b) and (c) of FIG. 3) is excessive, thereby causing overshoot.

In contrast, in the tap coefficient correcting expression disclosed in Patent Document 2, the function G(e(t)) includes, as the small-error region (|e(t)|≤A) of the sign algorithm, a linear zone in which the tap coefficient correcting amount is proportional to the error, as is defined by the following equations (7):

$$G(e(t)) = \frac{1}{A}e(t) \quad |e(t)| \le A \quad (7)$$

$$G(e(t)) = \text{sign}(e(t)) \quad |e(t)| > A$$

$$\gamma = 1$$

FIG. 4 shows the function expressed by the equations (7). In FIG. 4, the horizontal axis indicates the error signal e(t) (instantaneous value), and the vertical axis indicates the value of the function G(e(t)). In the case of FIG. 4, the function G(e(t)) includes, as the small-error region of the sign algorithm, a linear zone (having a width of A) in which the tap coefficient correcting amount is proportional to the error signal e(t). The overshoot suppressing effect of the linear zone reduces the residual echo level. In other words, the algorithm of Patent Document 2 is an algorithm obtained by providing the LMS algorithm with a correction scale limiter. This algorithm will be hereinafter referred to as "the Ideal Limiter formula." By virtue of the limiter effect, the algorithm of Patent Document 2 exhibits robustness against double talk, like the Infomax formula.

However, the convergence speed of the tap coefficient in the Ideal Limiter formula is lower than in the Infomax formula, because the coefficient correction scale in the linear zone of FIG. 4 is relatively small.

The difference in $G(e(t))$, which serves as a function associated with the error signal $e(t)$ (instantaneous value), causes the above-mentioned difference in residual echo and convergence speed between the Infomax formula of Patent Document 1 and the Ideal limiter formula of Patent Document 2. This difference seems to be caused by the appearance probability of the error signal $e(t)$. In general, in the initial stage of the correction of the tap coefficient, the scale of errors keeps large. At this time, the appearance probability of the error signal $e(t)$ that falls within the minimal-error region or the linear zone is relatively low. Therefore, it is considered that in the correction initial stage, no significant difference will easily occur between both formulas.

In contrast, when the tap coefficient correction advances to reduce the scale of errors, the appearance probability of the error signal $e(t)$ that falls within the minimal-error region or the linear zone becomes relatively high. Accordingly, in the Infomax formula of Patent Document 1, overshoot will occur with a high probability, while in the Ideal Limiter formula of Patent Document 2, a relative shortage of correcting amount may occur.

In light of the above, in the embodiment, by modifying the graphical characteristic of the function $G(e(t))$ expressed by the equation (4), a relatively large correction scale is realized in a small-error region greater in error level than a minimal-error region in order to accelerate convergence, with the correction scale for the minimal-error region suppressed to minimize the probability of overshoot.

FIG. 5 schematically shows the graphical characteristic of each of the functions $G(e(t))$ employed in the above-mentioned conventional techniques (i.e., the LMS algorithm, the NLMS algorithm, the Infomax formula and the Ideal Limiter formula). Similarly, FIG. 6 schematically shows the graphical characteristic of the function $G(e(t))$ employed in the embodiment. In each figure, the straight line $F(e(t))$ is a tangential line assumed when $e(t)=0$, and shows a correction characteristic assumed when the error signal (instantaneous value) $e(t)$ is close to 0 (i.e., assumed in the minimal-error region).

The graphical characteristic of each of the functions $G(e(t))$ employed in the above-mentioned conventional techniques will now be described. In the LMS algorithm and the NLMS algorithm corresponding to the equations (5), the functions $G(e(t))$ are identical to straight line $F(e(t))$. This means that the functions $G(e(t))$ have a linear correction characteristic over the entire error region. Namely, the tap coefficient correction scale is constant.

In the Infomax formula expressed by one of the equations (6), the function $G(e(t))$ assumes a value higher than the straight line $F(e(t))$ when $e(t)<0$, and a value lower than the straight line $F(e(t))$ when $e(t)>0$. Namely, it has a characteristic of more greatly correcting the tap coefficient in a minimal-error region than in the other regions. In other words, the scale of correction in the regions other than the minimal-error region is smaller than in the minimal-error region.

In the Ideal Limiter formula expressed by the equations (7), the same processing as that of the LMS algorithm is performed in the linear zone, and the same processing as that of the Infomax formula is performed in the other regions.

As described above, in the conventional techniques, i.e., the LMS and NLMS algorithms, the Infomax formula, and the Ideal Limiter formula, the functions $G(e(t))$ do not assume a value lower than the value of the straight line $F(e(t))$ when $e(t)<0$, and do not assume a value higher than the value of the straight line $F(e(t))$ when $e(t)>0$, as is shown in FIG. 5.

In contrast, the embodiment employs a region (hereinafter, a correction scale increased zone), in which the scale of correction in a small-error region ($C<|e(t)|<D$; $C>0$, $D>C$) separate from the origin is set relatively larger than in a minimal-error region ($|e(t)|\leq C$) near the origin. C and D are first and second threshold values. By employing such a correction scale increased zone and performing a relatively large correction in the small-error region, the effect of accelerating the convergence from the small-error region to the minimal-error region can be expected. This also means that the correction scale in the minimal-error region ($|e(t)|\leq C$) is relatively reduced, thereby preventing the correction scale from being excessive in the minimal-error region.

As shown in FIG. 6, the function $G(e(t))$ of the embodiment includes two correction scale increased zones that depend on the error signal $e(t)$, i.e., a first region in which the function $G(e(t))$ assumes a value lower than the value of the straight line $F(e(t))$ when $e(t)<0$, and a second region in which the function $G(e(t))$ assumes a value higher than the value of the straight line $F(e(t))$ when $e(t)>0$. More specifically, in association with the function $G(e(t))$ and the straight line $F(e(t))$, the first and second regions are defined as below.

Firstly, the straight line $F(e(t))$ is defined as a line that has the same slope a as the function $G(e(t))$ and the same value (as an intercept $\bar{b}$) as that of the function $G(e(t))$ when $e(t)=0$. Namely, $F(\bar{e(t)})=a\cdot e(t)+b=\Delta G(0)\cdot e(t)+G(0)$. In this case, in the first region, $e(t)<0$ and $G(e(t))<F(e(t))$, and in the second region, $e(t)>0$ and $G(e(t))>F(e(t))$. The function $G(e(t))$ shown in FIG. 6 has both first and second regions that serve as correction scale increased zones. Alternatively, the function $G(e(t))$ may have only one of the regions.

Further, the function $G(e(t))$ shown in FIG. 6 includes a limiter so that it exhibits robustness against double talk, as in the Infomax formula and the Ideal Limiter formula. More specifically, the value of the function $G(e(t))$ must fall within a range of $\pm\delta$ ($\delta$ is a certain finite positive number). Namely, $|G(e(t))|\leq\delta$. As the positive number $\delta$, an experimentally suitable value is selected. As the minimum condition, the function $G(e(t))$ must satisfy $|G(e(t))|\leq\infty$ if $|e(t)|=\infty$.

From the above-mentioned definition of the straight line $F(e(t))$, the slope a of the function $G(e(t))$ assumed when $e(t)=0$ must be a finite value. Namely, the case of $a=\infty$ is excluded. Further, in order to impart, to the function $\bar{G}(e(t))$, the aforementioned correction scale increased zone (at least one of the first and second regions), the slope a of the function $G(e(t))$ must include a positive region. Furthermore, the intercept b may not always be set to 0. However, if the intercept b is 0, the function $G(e(t))$ can impart a symmetrical tap coefficient correcting characteristic to the error signal $e(t)$.

Tap coefficient correcting expressions with a correction scale increased zone defined as the above will hereinafter collectively be referred to as an algorithm with a correction scale increased zone. If the algorithm with the correction scale increased zone is generalized, an algorithm is obtained which defines that:

(a) The function $G(e(t))$ outputs a first value $e(t)/A$ obtained by multiplying the error signal $e(t)$ by the inverse of a second threshold value higher than a first threshold value D, if the absolute value $|e(t)|$ of the error signal $e(t)$ is not higher than the threshold value D;

(b) The function $G(e(t))$ outputs a second value if $|e(t)|$ is higher than the first threshold value D and lower than a second threshold value A, and if $e(t)$ is negative, and outputs a third value higher than e(t)/A if |e(t)| is higher than the first threshold value D and lower than the second threshold value A, but if e(t) is positive; and (c) The function G(e(t)) outputs a fourth value sign(e(t)) indicating the sign function of the error signal e(t), if |e(t)| is not lower than the second threshold value A.

A description will now be given of some methods of applying the algorithm with the correction scale increased zone, referring to individual graphical characteristics of the function G(e(t)). Assume here that the tap coefficient correcting unit 4 shown in FIG. 1 can apply the following one or more algorithms that employ a correction scale increased zone, and can selectively use them by setting.

(Ideal Limiter Formula with Correction Scale Increased Zone)

The graphical characteristic of the function G(e(t)) shown in FIG. 6 can be easily realized using the following equations (8):

$$G(e(t)) = \frac{1}{A}e(t) \quad |e(t)| \le A - B \qquad (8)$$
$$G(e(t)) = \text{sign}(e(t)) \quad |e(t)| > A - B$$
$$\gamma = 1$$
here $0 < B < A$ As illustrated in FIG. 7, in the function G(e(t)) given by the numerical expressions of FIG. 8, the correction scale of a peripheral region (A−B<|e(t)|<A; 0<B<A) around the linear zone, to which the Ideal Limiter formula is applied, becomes larger than that of the linear zone by extending the influence range of the sign function to the peripheral region. Namely, the peripheral region is made to be a correction scale increased zone. The value A−B corresponds to the aforementioned first threshold value D. The function G(e(t)) shown in FIG. 6 can be realized simply by changing the threshold value A (linear zone width) in the equations (7) to the first threshold value D=A−B. The value B will hereinafter be referred to as a correction scale increased zone width.

The algorithm given by the equations (8) is an algorithm in which acceleration of convergence of the Ideal Limiter formula is expected by performing proportional correction in the minimal-error region defined by |e(t)|≤A−B, and performing a larger scale correction in the small-error regions (correction scale increased zones) existing with the minimal-error region interposed therebetween. This algorithm will be hereinafter referred to as an "Ideal Limiter formula with a correction scale increased zone." Assuming here that the linear zone width is A, the numerical expressions (8) represent the Ideal Limiter formula if B=0, represent the Infomax formula if B=A, and represent the Ideal Limiter formula with the correction scale increased zone if 0<B<A.

(Simple Experiment for Verifying Effect of Correction Scale Increased Zone)

To verify the effect of the provision of the above-mentioned correction scale increased zone, comparison was made among the Ideal Limiter formula (B=0), the Infomax formula (B=A) and the Ideal Limiter formula with the correction scale increased zone (0<B<A), using, as the reference signal x(t), Gaussian white noise obtained by sampling of 11,025 Hz and 16 bits for about 29 seconds, and using, as the microphone output m(t), the voice obtained by delaying the noise by 32 samples. Further, the linear zone width A was set to 100, the normalizing coefficient γ was set to 1, the step gain μ was set to 0.0000001, and the tap number N was set to 256.

FIG. 8 shows variations in maximum ERLE assumed when the correction scale increased zone width B is varied. From this experiment, it can be understood regarding the echo cancellation performance (maximum ERLE: Echo Return Loss Enhancement) that the Ideal Limiter formula (B=0) is superior to the Infomax formula (B=100), and that provision of an appropriate correction scale increased zone further improves the echo cancellation performance.

FIG. 9 shows variation in ERLE obtained when 4.46 seconds elapsed after the ERLE of the Ideal Limiter formula (B=0) exceeded 30 dB, and when the correction scale increased zone width B was changed, the variation being used as a standard for convergence speed (i.e., the rate of rising of ERLE). From FIG. 9, it can be understood that the Infomax formula (B=100) is superior to the Ideal Limiter formula (B=0), and that provision of an appropriate correction scale increased zone further improves the convergence speed.

Since the correction scale increased zone width B is a threshold value for the amplitude of a signal, it depends on the scale of the error signal e(t). Therefore, echo cancellation performance levels (maximum ERLE values) were detected when the amplitudes of the microphone output m(t) and the reference signal x(t) were doubled, tripled and quadrupled. This process is equivalent to the process where the error signal e(t) is doubled, tripled and quadrupled.

(a), (b), (c) and (d) of FIG. 10 show the relationship between the maximum ERLE and the correction scale increased zone width B, obtained when the amplitude of an input signal is unchanged, doubled, tripled and quadrupled, respectively. In (a), (b), (c) and (d) of FIG. 10, the correction scale increased zone width B=0 indicates the Ideal Limiter formula, and the correction scale increased zone width B=100 indicates the Infomax formula. Assuming that the value at the end, close to the origin, of the positive one of the correction scale increased zones (i.e., at the lower end of the positive correction scale increased zone) is C, C=A−B. It is understood from the experiment that if the amplitude of the input signal is doubled, tripled and quadrupled, C=A−B, which makes ERLE maximum, is increased. It is understood from the experiment that C is substantially doubled, tripled and quadrupled. Namely, when the amplitude of the input signal is multiplied by n, the value C at the lower end of the positive correction scale increased zone, in which ERLE is maximum, is substantially $2^{n-1}$ times. At this time, the Ideal Limiter formula with the correction scale increased zone, into which the value C is introduced, is given by the following equations (9):

$$G(e(t)) = \frac{1}{A}e(t) \quad |e(t)| \le C \qquad (9)$$
$$G(e(t)) = \text{sign}(e(t)) \quad |e(t)| > C$$
$$\gamma = 1$$
here $0 < C < A$ Further, the lower end C of the correction scale increased zone in this example is considered to be given by the following equation (10):

$$C = C0 \cdot 2^{\frac{Me}{M0}-1} \qquad (10)$$

where C0 is the value at the lower end of the positive correction scale increased zone (in which ERLE is maximum), obtained by an experiment performed in advance, M0 is the average (average absolute amplitude) of the absolute amplitudes of the error signal e(t) used in the experiment, and Me is the average (moving average absolute amplitude) of the absolute amplitudes of the error signal e(t) actually obtained during the time period ranging between the present time and a preset past time. Thus, it is assumed that the value C at the lower end of the positive correction scale increased zone is set to an appropriate experimental value.

As can be understood from (a), (b), (c) and (d) of FIG. 10, the maximum ERLE sharply drops in the right portion of the correction scale increased zone width B in which ERLE is maximum. Accordingly, if the value C at the lower end of the positive correction scale increased zone, calculated by the equation (10), is directly applied, the region, in which the maximum ERLE sharply drops, may be entered because of measurement errors in C0, M0, Me, etc.

In light of the above, the tap coefficient correcting unit 4 sets the value C to the value obtained by adding a slight margin to the value resulting from the equation (10). An experimentally appropriate value is selected as the margin. The tap coefficient correcting unit 4 at least performs control for reducing the correction scale increased zone width B in accordance with an increase in the moving average absolute amplitude Me.

(InfoMax Formula with Dead Zone)

In a special case of the function G(e(t)) shown in FIG. 6, where the slope of the function G(e(t)) assumed when e(t)=0 is 0, i.e., if the straight line F(e(t)) is horizontal, the minimal-error region may include a dead zone in which no tap coefficient correction is performed. If this zone is applied to the Infomax formula, this formula is given by the following mathematical expressions. This formula will hereinafter be referred to an Infomax formula with a dead zone.

$$G(e(t)) = 0 \quad\quad |e(t)| \le C \text{ (dead zone)} \quad (11)$$
$$G(e(t)) = \text{sign}(e(t)) \quad\quad |e(t)| > C$$
$$G(e(t)) = \tanh(\alpha \cdot e(t)) \quad\quad |e(t)|C, \alpha > 0$$
$$G(e(t)) = \frac{1}{1+\exp(-\alpha \cdot e(t))} \quad\quad |e(t)| > C, \alpha > 0$$
$$G(e(t)) = \frac{2}{1+\exp(-\alpha \cdot e(t))} - 1 \quad |e(t)| > C, \alpha > 0$$
$$\gamma = 1$$
here $0 < C$ As illustrated as an example in FIG. 11, the function G(e(t)) given by the mathematical expressions (11) is characterized in that the minimal-error region (|e(t)|<C; 0<C) includes a dead zone in which the correction scale is 0. The function G(e(t)) of FIG. 11 can be realized simply by adding one threshold process. Although the value C greater than 0 corresponds to the lower end of the positive correction scale increased zone in the mathematical expressions (9), it will be herein referred to a dead zone width. The algorithm expressed by the mathematical expressions (11) is expected to suppress the excessive correction scale of the Infomax formula by the dead zone.

The dead zone width C depends on the level of the signal. It is a matter of course that if the substantial signal level in operational environment is estimated, a fixed dead zone width C may be used. If not, the value C should be dynamically controlled. Since the dead zone width C is a threshold value for the absolute value |e(t)| of the error signal e(t), the tap coefficient correcting unit 4 calculates the average (moving average absolute amplitude) of the absolute amplitudes of the error signal e(t) actually obtained during the time period ranging between the present time and a preset past time, thereby increasing the dead zone width C in accordance with an increase in the moving average absolute amplitude, and decreasing the dead zone width C in accordance with a decrease in the moving average absolute amplitude.

When the Infomax formula with the dead zone given by the mathematical expressions (11) is generalized as an algorithm with a dead zone, the function G(e(t)) is realized by a first function for outputting 0 if the absolute value |e(t)| of the error signal e(t) is not higher than the threshold value C, and a second function for outputting a value of the same sign as the error signal e(t) if the absolute value |e(t)| is higher than the threshold value C. More specifically, the second function is sign(e(t)), tan h(e(t) or 1/(1+exp(−e(t))). FIG. 11 shows an example in which the second function is sign(e(t)).

(Simple Experiment for Verifying Advantage of Dead Zone)

To verify the advantage of the above-mentioned dead zone, Gaussian white noise obtained by sampling of 11,025 Hz and 16 bits for about 29 seconds was used as a reference signal x(t), and the voice obtained by delaying the reference signal x(t) by 32 samples was used as the microphone output m(t), whereby the Infomax formula given by the expressions (6) (in which sign(e(t)) was employed), and the Infomax formula with the dead zone given by the expressions (11) were compared. Further, in this case, the normalization coefficient γ was set to 1, the step gain was set to 0.0000001, and the tap number N was set to 256.

FIG. 12 shows variations in maximum ERLE that occur during 29 seconds when the dead zone width C is varied. In FIG. 12, C=0 indicates the conventional Infomax formula. It is understood from this experiment that the echo cancellation performance is improved if an appropriate dead zone is imparted to the function sign(e(t)).

The dead zone width C is a threshold value for signal amplitudes, and hence depends on the scale of the error signal e(t). Therefore, echo cancellation performance levels (maximum ERLE values) were detected when the amplitudes of the microphone output m(t) and the reference signal x(t) were doubled, tripled and quadrupled. This process is equivalent to the process where the error signal e(t) is doubled, tripled and quadrupled.

(a), (b), (c) and (d) of FIG. 13 show the relationship between the maximum ERLE and the dead zone width C, obtained when the amplitude of an input signal is unchanged, doubled, tripled and quadrupled, respectively. In (a), (b) (c) and (d) of FIG. 13, the dead zone width C=0 indicates the Infomax formula. From this experimental data, it is understood that if the amplitude of the input signal is doubled, tripled and quadrupled, the dead zone width C, in which ERLE is maximum, becomes substantially four times, nine times and sixteen times. Namely, the dead zone width C, in which ERLE is maximum, is proportional to the square of the amplitude of the input signal. Accordingly, in this case, the dead zone width C, in which ERLE is maximum, is calculated using the following equation (12):

$$C = C0 \frac{Pe}{P0} \quad\quad (12)$$

where C0 is a dead zone width near the maximum ERLE, and is beforehand obtained experimentally, and P0 is the average power of the error signal e(t) used in the experiment. C0 and P0 will be hereinafter referred to a reference dead zone width C0 and reference power P0, respectively. Further, Pe is the moving average power of the actual error signal e(t) obtained during the time period ranging between the present time and a preset past time. Thus, an experimental appropriate value is selected as the dead zone width C.

As can be understood from (a), (b), (c) and (d) of FIG. 13, the maximum ERLE more sharply drops in the left portion of the dead zone width C than in the right portion of the same. Therefore, if the dead zone width C calculated by the equation (12) is directly applied, the region in which the maximum ERLE sharply drops may be entered because of measurement errors in C0, P0, Pe, etc.

To avoid this, the tap coefficient correcting unit 4 sets the dead zone width to a value obtained by adding a margin to the dead zone width C calculated by the equation (12). An experimentally appropriate value is selected as the margin. The tap coefficient correcting unit 4 at least performs control for increasing the dead zone width C in accordance with an increase in the moving average power Pe.

The above is the result obtained when the function sign(e(t)) is used as the function G(e(t)). (a) and (b) of FIG. 14 show the relationship between the dead zone width C and the maximum ERLE obtained when tan h(e(t)) and $1/(1+\exp(-e(t)))$ were employed, respectively. In (a) and (b) of FIG. 14, the dead zone width C=0 indicates the conventional Infomax formula. It is understood from these figures that the relationship between the dead zone width C and the maximum ERLE in the case of tan h(e(t)) or $1/(1+\exp(-e(t)))$ is substantially the same as in the case of sign(e(t)), namely, substantially the same advantage is obtained, although the maximum ERLE slightly differs.

From the above-mentioned experiments, it was confirmed that not only in sign(e(t)) but also in tan h(e(t)) or $1/(1+\exp(-e(t)))$ proposed as the function of the Infomax formula, the echo cancellation performance can be improved if a similar dead zone is imparted. Note that in the equations (11), $2/(1+\exp(-e(t)))-1$ can be also selected as a function having the same characteristic as tan h(e(t)). Further, as in tan h($\alpha$·e(t)), a positive number a may be imparted as the gain of the error signal.

(Normalized Ideal Limiter formula with Correction Scale Increased Zone)

In the Ideal Limiter formula expressed by the mathematical expressions (7), a limiter is provided for the correction scale of the LMS algorithm. Then, what will happen if a similar limiter is provided for the NLMS algorithm defined by the following equations (13)?

$$G(e(t)) = e(t) \quad (13)$$
$$\gamma = \frac{1}{X(t)^T X(t)}$$

Assume here that the formula defined by the following mathematical expressions (14) will be referred to as a normalized Ideal Limiter formula:

$$G(e(t)) = \frac{1}{A} e(t) \quad |e(t)| \leq A \quad (14)$$
$$G(e(t)) = \text{sign}(e(t)) \quad |e(t)| > A$$
$$\gamma = \frac{1}{X(t)^T X(t)}$$
$$\text{here } 0 < A$$

Further, the normalized Ideal Limiter with the correction scale increased zone is defined by the following mathematical expressions (15). Also, the formula obtained by normalizing the Infomax formula is defined by the following mathematical expressions (16), and will be hereinafter referred to as a normalized Infomax formula. If B=A (A>0), the expressions (15) are the same as the expressions (16), while if B=0, the expressions (15) are the same as the expressions (14):

$$G(e(t)) = \frac{1}{A} e(t) \quad |e(t)| \leq A - B \quad (15)$$
$$G(e(t)) = \text{sign}(e(t)) \quad |e(t)| > A - B$$
$$\gamma = \frac{1}{X(t)^T X(t)}$$
$$\text{here } 0 < B < A$$
$$G(e(t)) = \text{sign}(e(t))$$
$$\gamma = \frac{1}{X(t)^T X(t)} \quad (16)$$

(Stop of Tap Coefficient Correction for Preventing Division by Zero)

If the reference signal x(t) continuously indicates silence, the dominator $X^T X$ of the normalizing coefficient $\gamma$ in the mathematical expressions (13) to (16) becomes 0, which disables calculation of $\gamma$. To avoid this, when $X^T X$ is less than a small positive number b, the tap coefficient correction is temporarily stopped.

To obtain a similar effect, a small positive number c, for example, may be added to the dominator as shown in the following equation (17). Alternatively, as shown in the following mathematical expressions (18), $\gamma$ may be forcedly set to 1/b if $X^T X$ is less than the small positive number b. These are examples where a positive variable that is close to $1/X^T X$ and never involves division by zero is used in place of temporarily stopping the tap coefficient correction.

$$\gamma = \frac{1}{X(t)^T X(t) + c} \quad (17)$$
$$\gamma = \frac{1}{X(t)^T X(t)} \quad X(t)^T X(t) \geq b$$
$$\gamma = \frac{1}{b} \quad X(t)^T X(t) < b \quad (18)$$

Further, $1/X^T X$ is the inverse of the total power of N reference signal levels obtained during the time period ranging between the present time and the first sampling time point N-1 (assuming that the present time is the last sampling time point and is set to 0). Instead of calculating $1/X^T X$ at every occasion, $1/X^T X$ may be calculated using the following mathematical expressions (19):

$$\frac{1}{Pw(t)} \approx \frac{1}{X(t)^T X(t)} \quad (19)$$

here, $$Pw(t) = \alpha x^2(t) + (1-\alpha) Pw(t-1)$$
$$0 < \alpha < 1$$

where Pw(t) is the value of $X^T X$ to be currently calculated, Pw(t-1) is the value of $X^T X$ already calculated one sampling before, x(t) is the current reference signal level, and $\alpha$ is a forgetting coefficient that assumes a positive value less than 1. In this case, $X^T X$ is calculated in the initial occasion, and thereafter, Pw(t) as an approximate value of $X^T X$ is calculated with a small number of calculations using the mathematical expressions (19). This is a method of approximating $1/X^TX$.

(Simple Experiment for Verifying Advantage of Correction Scale Increased Zone with Normalization)

Gaussian white noise obtained for about 29 seconds was used as a reference signal x(t), and the voice obtained by delaying the reference signal x(t) by 32 samples was used as the microphone output m(t), whereby the echo cancellation performance (maximum ERLE) levels of the normalized Ideal Limiter formula with the correction scale increased zone (defined by the mathematical expressions (14)), obtained when the amplitudes of the microphone output and the reference signal were both doubled, tripled and quadrupled, were checked. The linear zone width A was set to 100, the normalizing coefficient γ was set to $X^TX$, the step size μ was set to 50=0.5×A, and the tap number N was set to 256. Further, to prevent division by zero, correction was stopped when $X^TX$ was less than 1024.

(a), (b), (c) and (d) of FIG. 15 show the relationship between the maximum ERLE and the correction scale increased zone width B, obtained when the amplitude of the input signal is unchanged, doubled, tripled and quadrupled, respectively. In (a), (b), (c) and (d) of FIG. 15, the correction scale increased zone width B=0 indicates the normalized Ideal Limiter formula defined by the mathematical expression (14), and the correction scale increased zone width B=100 indicates the normalized Infomax formula defined by the equations (16). From these figures, it can be understood that the performance near B=80 (i.e., the correction scale increased zone lower limit C=20) is maximum regardless of the signal amplitudes. Thus, an experimentally appropriate value is selected as the correction scale increased zone width B.

As is apparent from (a), (b), (c) and (d) of FIG. 15, the maximum ERLE more sharply drops in the right portion of the correction scale increased zone width B in which ERLE is maximum, than in the left portion. In light of this, the tap coefficient correcting unit 4 sets the width B to the value obtained by subtracting a margin from the correction scale increased zone width B in which ERLE is maximum. An experimentally appropriate value is selected as the margin.

FIG. 16 shows variation in ERLE obtained when 4.46 seconds elapsed and when the amplitude of the input signal was unchanged, the variation being used as a standard for convergence speed. As is evident from FIG. 16, the normalized Ideal Limiter formula (B=0) is superior to the normalized Infomax formula (B=100), and the provision of an appropriate correction scale increased zone little more increases the convergence speed.

Further, in the Ideal Limiter formula with the correction scale increased zone, the graphical characteristics of the function G(e(t)) are not limited to those given by the mathematical expressions (8) or (15). When e(t) falls within the correction scale increased zone, it is sufficient if e(t) is negative and G(e(t))<e(t)/A, and if e(t) is positive and G(e(t))>e(t)/A.

(Modification)

The embodiment is not limited to the above-described embodiment, but may be modified in various ways without departing from the scope.

(Graphical Characteristic of μ·G)

In the aforementioned embodiment, a preset characteristic is imparted to the graphical characteristic of the function G(e(t)). A similar characteristic may be imparted to the function μ·G(e(t)) obtained by multiplying G(e(t)) by step size μ.

For instance, assume that the function G(e(t)) follows, over the entire region of the error signal e(t), the Ideal Limiter formula defined by the mathematical expressions (7) or the normalized Ideal Limiter formula defined by the mathematical expressions (14). Also assume that the step size μ in the equation (4) is set to μ1 in the correction scale increased zone, and to μ2 (<μ1) in the other regions. In this case, even though μ1>μ2, the same effect as in the Ideal Limiter formula with the correction scale increased zone defined by the equation (10), or as in the normalized Ideal Limiter formula with the correction scale increased zone defined by the mathematical expressions (15), can be obtained by the correction scale increased zone.

Further, assume, for example, that the function G(e(t)) follows the Infomax formula, defined by the equations (6), over the entire region of the error signal e(t), and that the step size μ in the equation (4) is set to μ1 in the dead zone width zone, and to μ2 in the other regions. In this case, even when μ1=0 and μ2>0, the same effect as in the Infomax formula with the dead zone defined by the mathematical expressions (8) can be obtained.

Furthermore, even when, for example, the function G(e(t)) is fixed at a constant value (e.g., 1), and the step size μ is not limited to a positive value, but is controlled as a function of the error signal e(t) so that it is proportional to the graphical characteristic of the function G(e(t)), the same effect as the above can be obtained.

Namely, assuming that a function corresponding to the product of μ, γ and G is set as H(e(t)), if H(e(t)) is controlled as a function of the instant value e(t) of the error signal so that it satisfies the graphical characteristic of the function G(e(t)) of the embodiment, the step size μ can be calculated in various ways. The tap coefficient correction expression given in this case is:

$$W(t+1) = W(t) + \mu(e(t)) \cdot \gamma(e(t)) \cdot G(e(t)) \cdot X(t) \quad (20)$$
$$= W(t) + H(e(t)) \cdot X(t)$$

(Difference between Embodiment and Formula for Controlling Step Size on Long-Term Basis)

It is generally known that adaptive filters will have a lower convergence accuracy but a higher convergence speed if the step size μ is larger, and will have a higher convergence accuracy but a lower convergence speed if the step size μ is smaller. Accordingly, by monitoring the tendency of, for example, reduction of the error signal level to detect that filter coefficient convergence advances, and reducing, for example, the step size μ in accordance with the degree of advance, long-term control of μ can be performed in which the convergence speed is prioritized at the initial stage and the convergence accuracy is prioritized after the convergence advances. However, the instant value e(t) of the error signal dynamically varies momentarily, and therefore, the tendency of reduction of the error signal level cannot be detected in the instant value. To detect it, it is necessary to calculate, for example, the average power <$e^2$> of the error signal measured during a relatively long term M. The tap coefficient correcting expression is given by the following equations (21):

$$W(t+1) = W(t) + \mu(\langle e^2 \rangle) \cdot \gamma \cdot G(e(t)) \cdot X(t) \quad (21)$$
$$\langle e^2 \rangle = \frac{1}{M} \sum_{j=0}^{M-1} e(t-j)^2$$

This formula differs from the embodiment in which the tap coefficient correction scale is controlled at intervals in accordance with the instant value e(t) of the error signal. In the embodiment, since the correction scale in a minimal-error region is set relatively smaller than in a small-error region, the same effect (i.e., correction scale is increased in the small-error region to increase the convergence speed, while it is decreased in the minimal-error region to enhance the accuracy of convergence) can be obtained at a convergence advanced stage (at which a small number of large-error regions appear, and a large number of small-error and minimal-error regions appear). Namely, the embodiment differs from the case expressed by the equations (21) in which a convergence stage is estimated based on observation of a certain time period, and the correction scale (as the value is controlled in accordance with the estimated stage to thereby acquire a determined effect. In the embodiment, the correction scale (as the value μ) is constantly controlled in accordance with the instant value of the error signal to thereby acquire a similar effect stochastically. Moreover, in the embodiment, by limiting $|G(e(t))| \leq \delta$, robustness against double talk similar to that of the Ideal Limiter formula is realized. Therefore, if the embodiment is combined with the long-term step-size control given by the equation (20), it is expected to provide an advantage that while keeping robustness against double talk by the effect of the latter technique, the convergence speed is prioritized in the initial stage by the former technique, and after the convergence advances, the convergence accuracy is prioritized by the latter technique, with the convergence speed improved. Thus, both techniques can be combined.

(Difference between Embodiment and Conventional Algorithms Including LMF Algorithm)

Further, a least mean fourth (LMF) algorithm defined by the following equations (22) is known as an algorithm in which the above-mentioned equations (21) as the step-size long-term control formula is applied to the error signal instant value e(t):

$$G(e(t)) = e^3(t)$$

$$\gamma = 1 \qquad (22)$$

The LMF algorithm uses $e^3(t)$ as the function $G(e(t))$, instead of $e(t)$. Accordingly, in the entire region of the error signal except for 0, if $e(t)<0$, $G(e(t))<F(e(t))$, and if $e(t)>0$, $G(e(t))>F(e(t))$. This is the condition to be satisfied by the correction scale increased zone of the embodiment. Further, in the LMF algorithm, the correction scale monotonically increases in accordance with the instant absolute value $|e(t)|$ of the error signal e(t). It is considered that this characteristic of the LMF algorithm will stochastically perform the process of prioritizing the convergence speed in the initial stage and prioritizing the convergence accuracy after convergence advances.

However, the LMF algorithm does not include another condition, i.e., $|G(e(t))| \leq \delta$, to be satisfied by the function $G(e(t))$ of the embodiment, and therefore does not provide robustness against double talk. Moreover, since in this algorithm, the correction scale monotonously increases in accordance with $|e(t)|$, erroneous correction during double talk is greater than in the LMS algorithm.

The algorithm disclosed in the aforementioned Patent Document 3 (JP-A 2004-64681), which provides the same advantage as the LMF algorithm, will now be described. The algorithm of Patent Document 3 is defined by the following equations (23):

$$G(e(t)) = e(t) \qquad (23)$$

$$\gamma = \frac{2}{X(t)^T X(t) + \frac{v}{|e(t)| + \eta}}$$

The algorithm of Patent Document 3 includes the aforementioned normalizing coefficient γ (corresponding to the step size μ in Patent Document 2), more specifically, includes the instant value e(t) of the error signal in the term c of the equation (17). Assuming here that $H(e(t))=\mu \cdot \gamma \cdot G$, if $e(t)<0$, $H(e(t))<F(e(t))$, while if $e(t)>0$, $H(e(t))>F(e(t))$. This is the condition to be satisfied by the correction scale increased zone. Further, the tap coefficient correction scale monotonously increases in accordance with the instant absolute value $|e(t)|$ of the error signal e(t).

However, the algorithm of Patent Document 3 is similar to the LMF algorithm in that it does not include the aforementioned condition, $|G(e(t))| \leq \delta$, to be satisfied by the function $G(e(t))$ of the embodiment, and the correction scale monotonously increases in accordance with $|e(t)|$, whereby erroneous correction inevitably increases during double talk.

(Modification Using Nonlinear Filter)

In the above-described embodiment and modification, the linear filter 2 shown in FIG. 1 is used as a filter for simulating the echo path transfer characteristic. However, a nonlinear filter may be used instead of the linear filter 2. For instance, a Volterra filter of a second order or more known as a nonlinear filter may be used in place of the linear filter 2. The following equations (24) are used to calculate the echo replica y(t) of the second-order Volterra filter. The first term of the right side is a first-order linear term and is similar to the above-described linear filter, while the second term of the right side is a second-order nonlinear term.

$$y(t) = \sum_{k=0}^{N-1} (w1(k, t) \cdot x(t-k)) + \qquad (24)$$
$$\sum_{k=0}^{N-1} \sum_{l=0}^{N-1} (w2(k, l, t) \cdot x(t-k) \cdot x(t-l))$$
$$= W1(t)^T X(t) + W2(t)^T XX(t)$$

Here, $$W1(t) = [w1(0, t), w1(1, t), \ldots w1(N-1, t)]^T$$
$$X(t) = [x(t), x(t-1), \ldots x(t-N+1)]^T$$
$$W2(t) = \begin{bmatrix} w2(0, 0, t) & w2(0, 1, t) & \ldots & w2(0, N-1, t) \\ w2(1, 0, t) & w2(1, 1, t) & \ldots & w2(1, N-1, t) \\ \ldots & \ldots & \ldots & \ldots \\ w2(N-1, 0, t) & w2(N-1, 1, t) & \ldots & w2(N-1, N-1, t) \end{bmatrix}$$

$$XX(t) = \begin{bmatrix} x(0, t) \cdot x(0, t) & x(0, t) \cdot x(1, t) & \ldots & x(0, t) \cdot x(N-1, t) \\ x(1, t) \cdot x(0, t) & x(1, t) \cdot x(1, t) & \ldots & x(1, t) \cdot x(N-1, t) \\ \ldots & \ldots & \ldots & \ldots \\ x(N-1, t) \cdot & x(N-1, t) \cdot & \ldots & x(N-1, t) \cdot \\ x(0, t) & x(1, t) & & x(N-1, t) \end{bmatrix}$$

Tap coefficient correction is performed by applying the following tap coefficient correcting expressions (25) and (26)

to N tap coefficients w1 providing the linear term of the Volterra filter, and the N×N tap coefficients w2 providing the nonlinear term, respectively. Independent normalizing coefficients γ, step sizes μ and functions G may be employed in the equations (25) and (26).

$$W1(t+1)=W1(t)+\mu \cdot \gamma \cdot G(e(t)) \cdot X(t) \quad (25)$$

$$W2(t+1)=W2(t)+\mu \cdot \gamma \cdot G(e(t)) \cdot XX(t) \quad (26)$$

(Modification Using Program or Recording Medium)

The embodiment is not limited to the signal processing apparatus shown in FIG. 1, or the signal processing method according to the flowchart of FIG. 2, but may be realized by a computer functioning as the signal processing apparatus shown in FIG. 1, or by a program for executing the signal processing procedure of FIG. 2, or by a computer readable recording medium storing the program.

(Program Executed by Computer)

More specifically, the embodiment can be realized using such a computer as shown in FIG. 17. In FIG. 17, a microphone 11 and a loud speaker 23 correspond to the microphone 7 and the loud speaker 6 of FIG. 1, respectively.

Near-end voice is converted into an acoustic signal by the microphone 11, and is then converted into a digital acoustic data by an A/D converter 12. The digital acoustic data from the A/D converter 12 is processed by a CPU 13 for executing programmed instructions. The CPU 13 is connected to a RAM 14, a ROM 15, an HDD 16, a LAN 17, a mouse/keyboard 18 and a display 19, which are standard devices providing a computer. A line interface 20 is a device used to at least receive and send digital acoustic data from and to a far end. Drives (and other storage) 21 for supplying the computer with programs and data via an external storage medium specifically comprise a CD-ROM drive, a floppy (trademark) disk drive, a CF/SD card slot, a USB interface, etc. Far-end digital acoustic data received via the line interface 20 is converted into an analog acoustic signal by a D/A converter 22, and is amplified and output through a loud speaker 23.

In the computer system shown in FIG. 17, the HDD 16 stores a signal processing program for executing the process shown in FIG. 2 for echo canceling, and the CPU 13 loads the program into the RAM 14 and executes it. In this case, the microphone 11 and the A/D converter 12 are used as the input terminals of the near-end microphone output m(t), and the D/A converter 22 and the loud speaker 23 are used as the output terminals for the input x(t) received from the far end via the line interface 20. The CPU 13 processes the microphone output m(t) and the received input x(t) to thereby generate an echo cancel output (error signal) e(t), and outputs it to the far end via the line interface 20.

As a result, the computer system of FIG. 17 functions as an acoustic echo canceller. The computer system can receive an echo canceling program from a recording medium inserted in other storage 21, or from another apparatus connected via the LAN 17. Further, the computer system can accept user operation inputs and present information for users via the mouse/keyboard 18 and the display 19.

(Recording Medium)

The embodiment can also be carried out in the form of a recording medium storing a program, as is shown in FIG. 18. A recording medium 31, which is realized by a CD-ROM, a CF, an SD card, a floppy disk, a USB memory, etc., for storing the signal processing program employed for echo canceling in the embodiment, is inserted into an electronic apparatus 32 or 33, or into a robot 34, whereby the program is executed. Alternatively, the program is supplied from the electronic apparatus 33 to another electronic apparatus 35 or to the robot 34 via communication, whereby it is executed on the electronic apparatus 35 or the robot 34.

(Another Embodiment in which Signal Processing Apparatus is Used as Line Echo Canceller)

In the above description, the signal processing apparatus of the embodiment has been described as an acoustic echo canceller for eliminating a loud-speaker output echo (acoustic echo) from the output of the microphone. Also in a two-wire or four-wire line via a hybrid transformer in a transmission path, the echo resulting from a transmission output mixing into a received input because of the hybrid transformer is known. This echo will now be referred to as "the line echo." The signal processing apparatus of the embodiment may be used as a line echo canceller for eliminating such a line echo.

FIG. 19 shows a loudspeaker apparatus according to another embodiment and comprising both an acoustic echo canceller 1 and a line echo canceller 9. The signal processing apparatus of the embodiment is used as each of the echo cancellers 1 and 9. The microphone output m(t) of the microphone 7 that receives near-end voice has its acoustic echo canceled by the acoustic echo canceller 1, and is then output as an error signal e(t).

On the other hand, in the line echo canceller 9, a line echo is canceled from a received input x(t) received via a transmission path, thereby outputting an error signal f(t). The error signal f(t) is amplified and output through a loudspeaker 6. At this time, the acoustic echo canceller 1 uses, as a reference signal x(t), the error signal f(t) output from the line echo canceller 9. Further, the line echo canceller 9 uses, as a reference signal, the error signal e(t) output from the acoustic echo canceller 1.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A signal processing method comprising:
   performing filter processing of convoluting a tap coefficient in a first signal sequence to generate a second signal sequence;
   subtracting the second signal sequence from a third signal sequence including an echo signal of the first signal sequence to generate a fourth signal sequence; and
   correcting the tap coefficient in accordance with an amount of correction determined using a function of the fourth signal sequence as a parameter,
   wherein the function includes at least one of a first region and a second region, and has values limited, the first region being included in a negative value region of the fourth signal sequence and being a region where the function outputs a value less than a value indicated by a straight line, the second region being included in a positive value region of the fourth signal sequence and being a region where the function outputs a value greater than a value indicated by the straight line, the straight line having a slope and an intercept that are identical to a slope and an intercept of the function assumed when the fourth signal sequence has a value of 0, the slope excluding zero.

2. The method according to claim 1, wherein the function includes a region in which the slope of the function is positive.

3. The method according to claim 1, wherein
(a) when an absolute value of the fourth signal sequence is not greater than a first threshold value, the function outputs a first value obtained by multiplying the fourth signal sequence by an inverse of a second threshold value greater than the first threshold value;
(b) when the absolute value exceeds the first threshold value and less than the second threshold value, the function outputs a second value less than the first value if the fourth signal sequence has a negative value, and outputs a third value greater than the first value if the fourth signal sequence has a positive value; and
(c) when the absolute value is not less than the second threshold value, the function outputs a fourth value that represents a sign function of the fourth signal sequence.

4. The method according to claim 3, wherein when the absolute value of the fourth signal sequence exceeds the first threshold value, the function is the sign function of the fourth signal sequence.

5. The method according to claim 1, wherein the intercept is 0.

6. The method according to claim 1, wherein the function comprises a first function that outputs 0 when the absolute value of the fourth signal sequence is not greater than a preset threshold value, and comprises a second function that outputs a value of a sign identical to a sign of the fourth signal sequence when the absolute value of the fourth signal sequence is greater than the preset threshold value.

7. A signal processing apparatus comprising:
a filter configured to perform filter processing of convoluting a tap coefficient in a first signal sequence to generate a second signal sequence;
a subtractor configured to subtract the second signal sequence from a third signal sequence including an echo signal of the first signal sequence to generate a fourth signal sequence; and
a correcting unit configured to correct the tap coefficient in accordance with an amount of correction determined using a function of the fourth signal sequence as a parameter,
wherein the function includes at least one of a first region and a second region, and has values limited, the first region being included in a negative value region of the fourth signal sequence and being a region where the function outputs a value less than a value indicated by a straight line, the second region being included in a positive value region of the fourth signal sequence and being a region where the function outputs a value greater than a value indicated by the straight line, the straight line having a slope and an intercept that are identical to a slope and an intercept of the function assumed when the fourth signal sequence has a value of 0, the slope excluding zero.

8. The apparatus according to claim 7, wherein the function includes a region in which the slope of the function is positive.

9. The apparatus according to claim 7, wherein
(a) when an absolute value of the fourth signal sequence is not greater than a first threshold value, the function outputs a first value obtained by multiplying the fourth signal sequence by an inverse of a second threshold value greater than the first threshold value;
(b) when the absolute value exceeds the first threshold value and less than the second threshold value, the function outputs a second value less than the first value if the fourth signal sequence has a negative value, and outputs a third value greater than the first value if the fourth signal sequence has a positive value; and
(c) when the absolute value is not less than the second threshold value, the function outputs a fourth value that represents a sign function of the fourth signal sequence.

10. The apparatus according to claim 9, wherein when the absolute value of the fourth signal sequence exceeds the first threshold value, the function is the sign function of the fourth signal sequence.

11. The apparatus according to claim 7, wherein the intercept is 0.

12. The apparatus according to claim 7, wherein the function comprises a first function that outputs 0 when the absolute value of the fourth signal sequence is not greater than a preset threshold value, and comprises a second function that outputs a value of a sign identical to a sign of the fourth signal sequence when the absolute value of the fourth signal sequence is greater than the preset threshold value.

13. A non-transitory computer readable medium encoded with computer executable instructions, wherein the instructions, when executed by a processor, cause the processor to execute a method comprising:
performing filter processing of convoluting a tap coefficient in a first signal sequence to generate a second signal sequence;
subtracting the second signal sequence from a third signal sequence including an echo signal of the first signal sequence to generate a fourth signal sequence; and
correcting the tap coefficient in accordance with an amount of correction determined using a function of the fourth signal sequence as a parameter,
wherein the function includes at least one of a first region and a second region, and has values limited, the first region being included in a negative value region of the fourth signal sequence and being a region where the function outputs a value less than a value indicated by a straight line, the second region being included in a positive value region of the fourth signal sequence and being a region where the function outputs a value greater than a value indicated by the straight line, the straight line having a slope and an intercept that are identical to a slope and an intercept of the function assumed when the fourth signal sequence has a value of 0, the slope excluding zero.

14. The medium according to claim 13, wherein the function includes a region in which the slope of the function is positive.

15. The medium according to claim 13, wherein
(a) when an absolute value of the fourth signal sequence is not greater than a first threshold value, the function outputs a first value obtained by multiplying the fourth signal sequence by an inverse of a second threshold value greater than the first threshold value;
(b) when the absolute value exceeds the first threshold value and less than the second threshold value, the function outputs a second value less than the first value if the fourth signal sequence has a negative value, and outputs a third value greater than the first value if the fourth signal sequence has a positive value; and
(c) when the absolute value is not less than the second threshold value, the function outputs a fourth value that represents a sign function of the fourth signal sequence.

16. The medium according to claim 15, wherein when the absolute value of the fourth signal sequence exceeds the first threshold value, the function is the sign function of the fourth signal sequence.

17. The medium according to claim 13, wherein the intercept is 0.

18. The medium according to claim 13, wherein the function comprises a first function that outputs 0 when the absolute value of the fourth signal sequence is not greater than a preset threshold value, and comprises a second function that outputs a value of a sign identical to a sign of the fourth signal sequence when the absolute value of the fourth signal sequence is greater than the preset threshold value.

* * * * *